(12) United States Patent
Jarvis

(10) Patent No.: US 9,623,778 B2
(45) Date of Patent: Apr. 18, 2017

(54) TRANSPORT SYSTEM

(71) Applicant: Charles Dwight Jarvis, Jonesboro, GA (US)

(72) Inventor: Charles Dwight Jarvis, Jonesboro, GA (US)

(*) Notice: Subject to any disclaimer, the term of this patent is extended or adjusted under 35 U.S.C. 154(b) by 0 days.

(21) Appl. No.: 14/670,159

(22) Filed: Mar. 26, 2015

(65) Prior Publication Data

US 2016/0280112 A1    Sep. 29, 2016

Related U.S. Application Data

(63) Continuation-in-part of application No. 13/898,162, filed on May 20, 2013, now Pat. No. 9,327,747, and a continuation-in-part of application No. 13/657,857, filed on Oct. 22, 2012, now Pat. No. 8,444,166.

(51) Int. Cl.
*B60P 1/04*    (2006.01)
*B62D 63/06*    (2006.01)

(52) U.S. Cl.
CPC .............. *B60P 1/04* (2013.01); *B62D 63/064* (2013.01)

(58) Field of Classification Search
CPC ................................. B60P 1/04; B62D 63/064
USPC ........... 298/2, 3, 1 C, 17 T, 17 SG; 280/653, 280/47.32, 47.31
See application file for complete search history.

(56) References Cited

U.S. PATENT DOCUMENTS

| | | |
|---|---|---|
| 1,032,009 A | 7/1912 | Long |
| 1,103,759 A | 7/1914 | Gnatzig |
| 1,509,000 A | 6/1926 | Trowe |
| 2,037,222 A | 4/1936 | Farrar |
| 3,028,698 A | 4/1962 | Schmitt |
| 5,350,030 A | 9/1994 | Mawhinney et al. |
| 5,915,723 A | 6/1999 | Austin |
| 6,446,989 B1 | 9/2002 | Intengan |
| 6,508,478 B1 | 1/2003 | Ortez |
| 6,755,478 B2 * | 6/2004 | Messinger-Rapport .. B62B 1/24 298/3 |
| 7,140,630 B2 | 11/2006 | Abel |
| 7,296,807 B2 | 11/2007 | Zimmerman |
| 8,870,295 B1 * | 10/2014 | Pope .................... B60P 1/28 298/17 T |
| 2008/0084038 A1 | 4/2008 | Byers |

* cited by examiner

*Primary Examiner* — Stephen Gordon
(74) *Attorney, Agent, or Firm* — Crose Law LLC; Bradley D. Crose

(57) ABSTRACT

The apparatuses and methods disclosed herein may be pushed by hand or pulled by a motor vehicle. Thus, implementations of the transport device disclosed herein may have functions akin to a wheelbarrow or a dumping trailer, yet may provide easier and/or more efficient transportation and dumping functions over prior art wheelbarrows and dumping trailers. Implementation of the transport device disclosed herein also may be easier to push over an elevation or up a hill. Furthermore, in some implementations, the transport device disclosed herein includes four wheels and therefore can function like a cart. Still further, in some implementations, the transport device disclosed herein can have the functions of a wagon. In some implementations, the transport device includes a work bench.

20 Claims, 31 Drawing Sheets

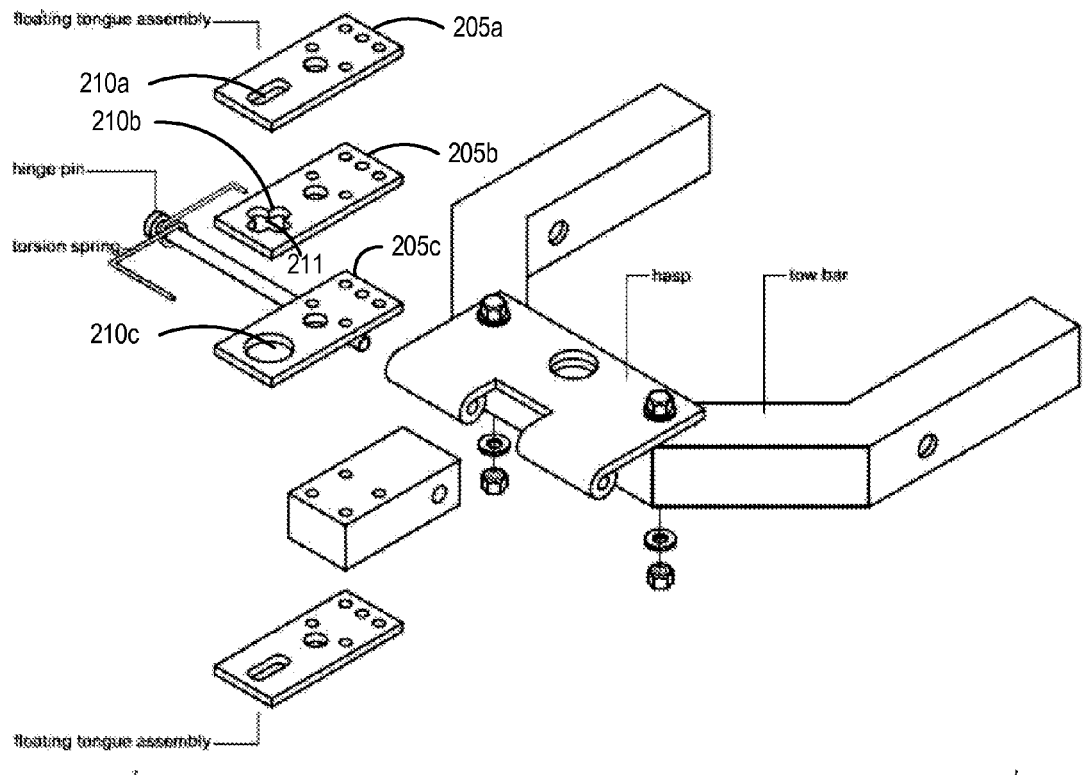
FIG. 2A
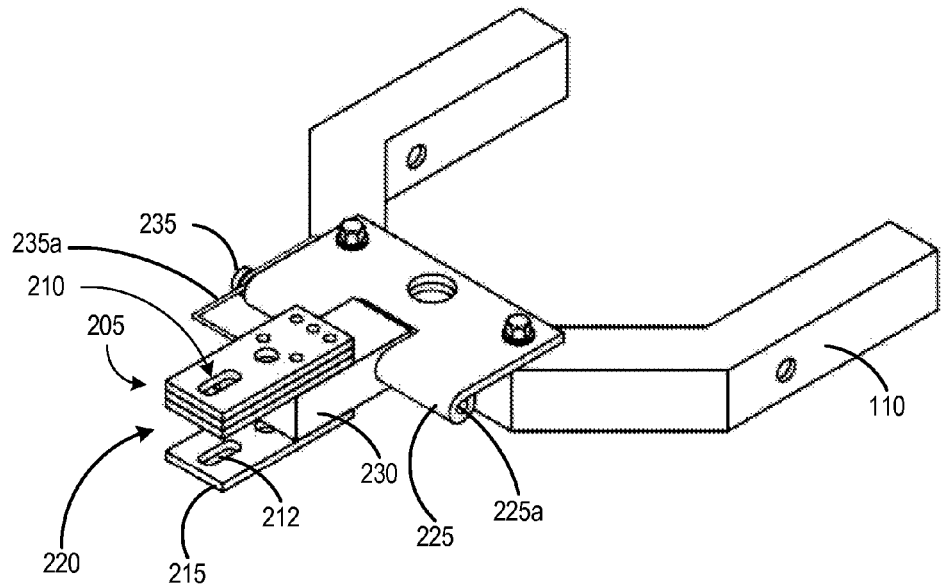

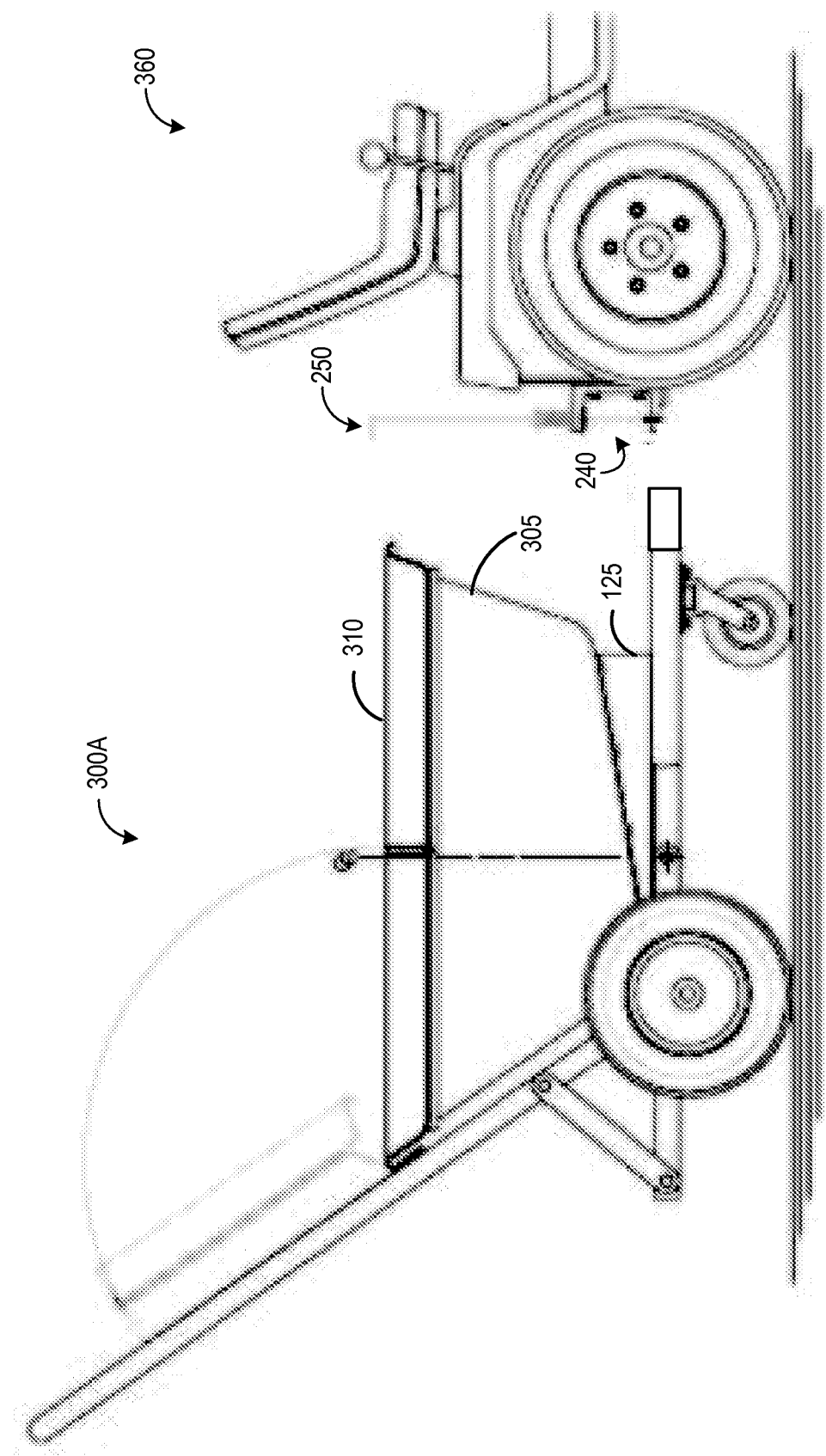

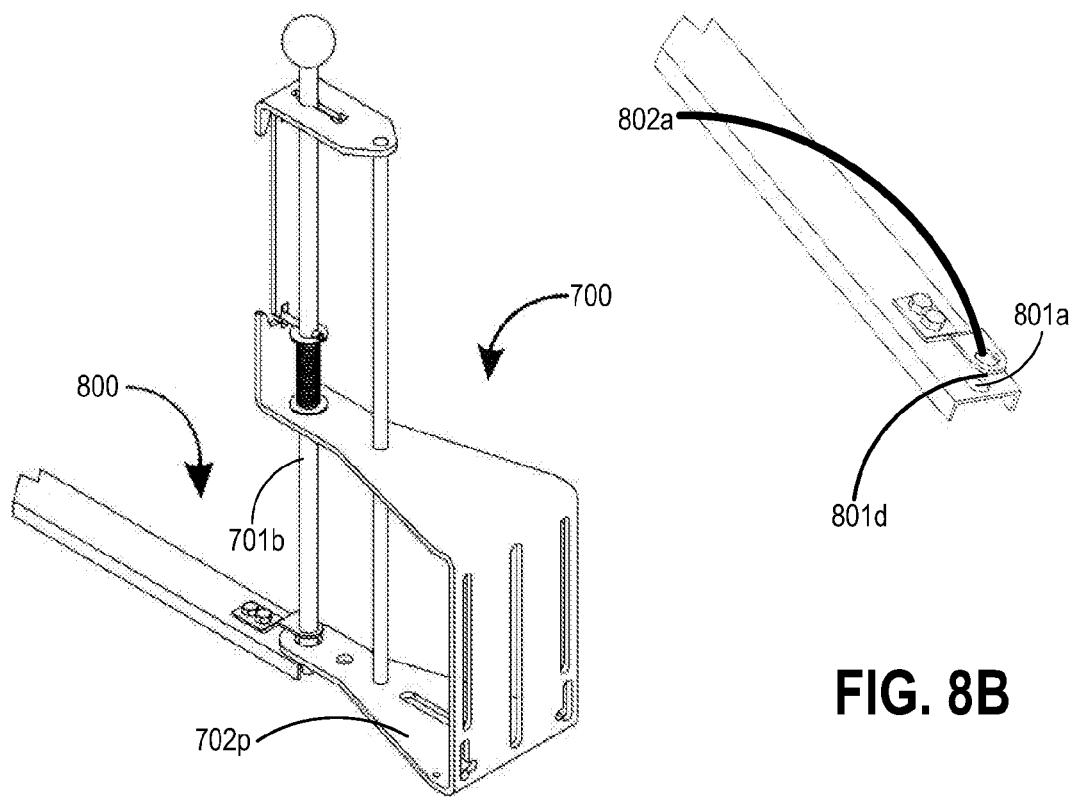
FIG. 8A
FIG. 8B
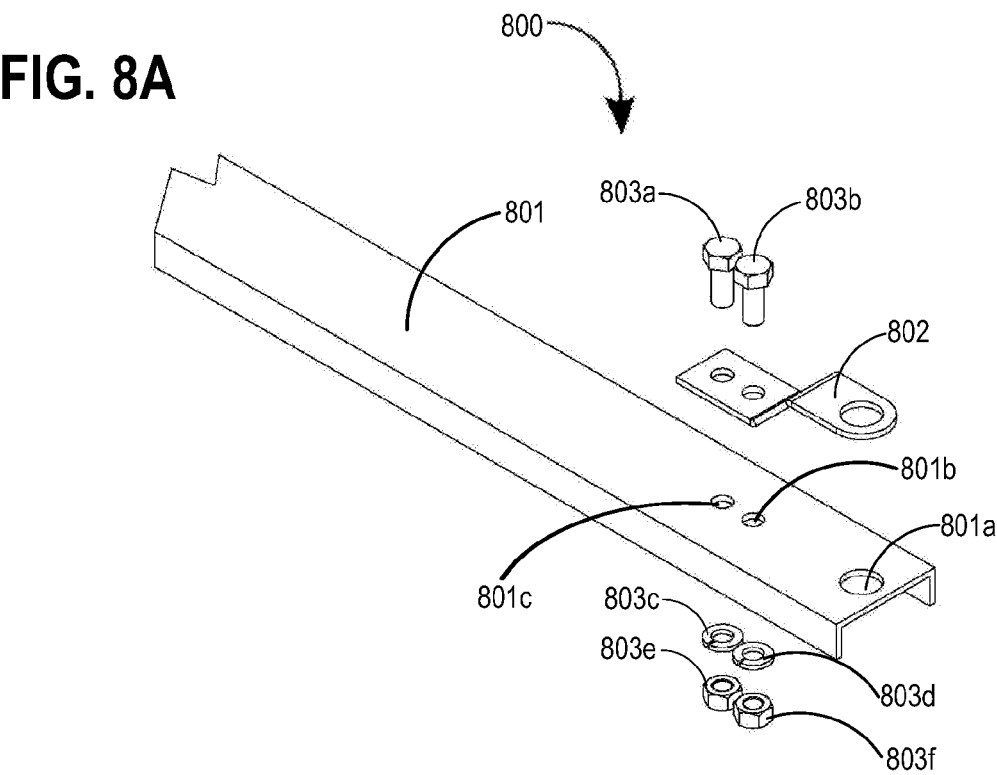
FIG. 8C

FIG. IIB

TRANSPORT SYSTEM

CROSS REFERENCE TO RELATED APPLICATION

This is a continuation-in-part application claiming the benefit of U.S. patent application Ser. No. 13/898,162, which was filed on May 20, 2013, which is a continuation application claiming the benefit of U.S. patent application Ser. No. 13/657,857, which was filed on Oct. 22, 2012, which issued as U.S. Pat. No. 8,844,166 on May 21, 2013 both of which are incorporated herein by reference in their entirety.

TECHNICAL FIELD

This disclosure relates to a transport system.

BACKGROUND

The wheelbarrow has been used for centuries to transport loads. In these many years, the functional design of the wheelbarrow has settled to what is believed to be the optimal design. However, the wheelbarrow has many inherent problems due to its functional design.

First, the wheelbarrow and the load must be substantially symmetrical about the mid-line that runs from the front wheel to the midpoint between the handles. If not handled properly by an operator, an improperly loaded wheelbarrow can become unbalanced, especially when turning, and fall to the side, thereby undesirably dumping at least part of its load.

Second, lifting and dumping the load in a wheelbarrow can be physically demanding. To dump a load, the operator must have the strength to raise the handles and the coordination to avoid prematurely dumping it.

Third, lowering the handles shifts the center of gravity toward the operator and increases the load on the operator's hands.

Fourth, because the handles must be lowered to do so, wheelbarrows are very difficult to push up a hill or over an elevation such as a curb.

The above problems may be magnified for people with physical impairments or vertically challenged.

Dumping trailers also are used to transport loads. However, dumping trailers are designed to be used by hitching them to riding lawn mowers. That is, dumping trailers are not designed to be conveniently pushed by an operator. Furthermore, dumping trailers cannot fully dump a load due to their limited range of motion. Thus, the operator must physically remove the portion of the load that was not automatically dumped from the dumping trailer during the dumping action.

BRIEF DESCRIPTION OF THE DRAWINGS

FIG. 2A illustrates an example implementation of a tongue adapter.

FIG. 3A illustrates a front-end tongue assembly without a tongue adapter to attach a transport device to a motor vehicle that has been equipped with a floating hitch.

FIGS. 5A-D illustrate an example implementation of an adjustable handle.

FIGS. 8A-C illustrate using the standard u-trailer tongue with the floating hitching system.

FIGS. 11A-B illustrate converting the vertical pin hitching system to a ball hitching system.

DETAILED DESCRIPTION

Various implementations of this disclosure provide apparatuses and methods for transporting and dumping loads. The implementations of the transport device disclosed herein may be pushed by hand or pulled by a motor vehicle. Thus, implementations of the transport device disclosed herein may have functions akin to a wheelbarrow or a dumping trailer, yet may provide easier and/or more efficient transportation and dumping functions over prior art wheelbarrows and dumping trailers. Implementation of the transport device disclosed herein also may be easier to push over an elevation or up a hill. Furthermore, in some implementations, the transport device disclosed herein includes four wheels and therefore can function like a cart. Still further, in some implementations, the transport device disclosed herein can have the functions of a wagon. In some implementations, the transport device includes a work bench.

Figure 1A:
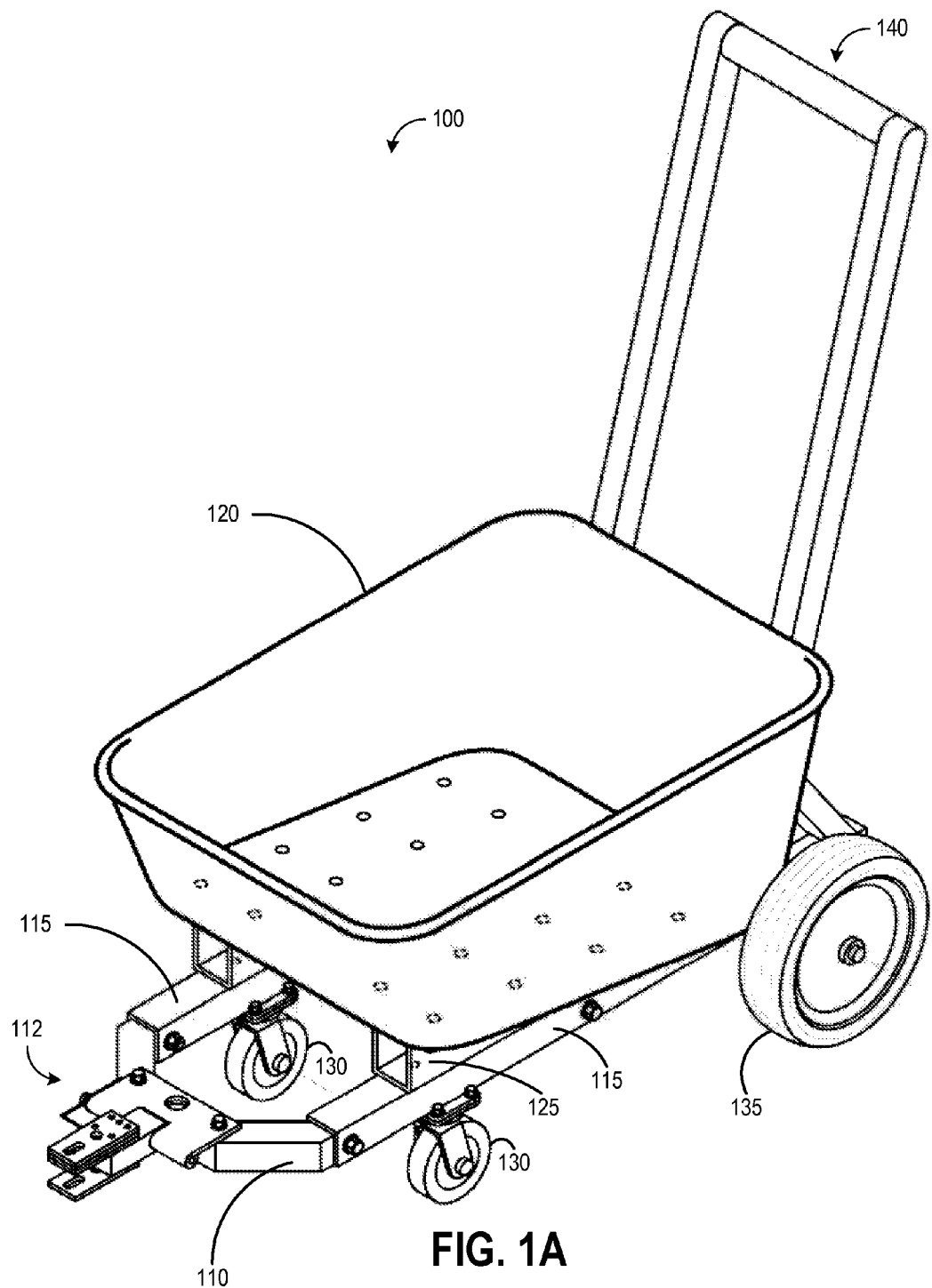
FIGS. 1A-1C illustrate an example implementation of a transport device according to the principles of the present disclosure.
Figure 1B:
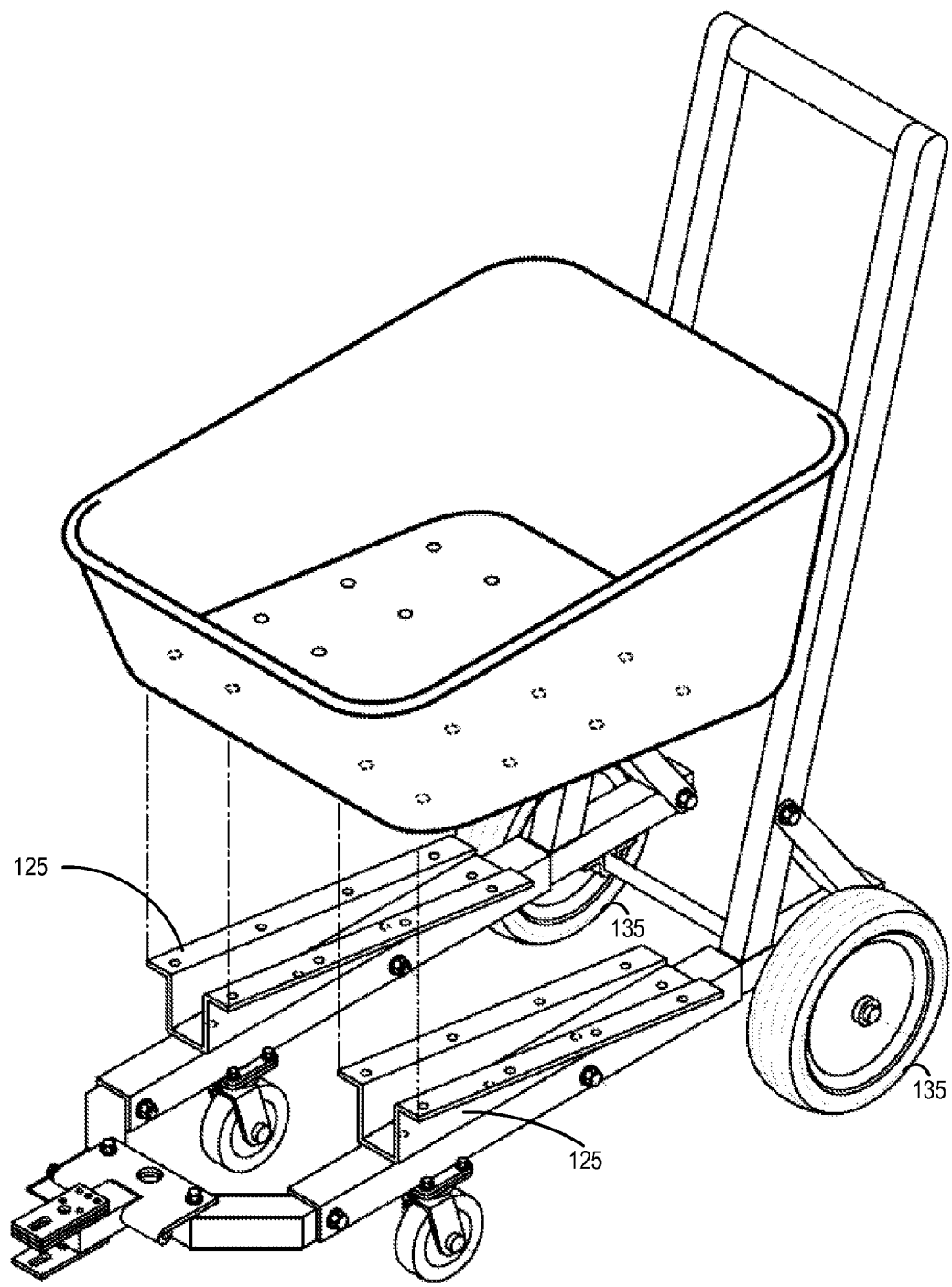
Figure 1C:
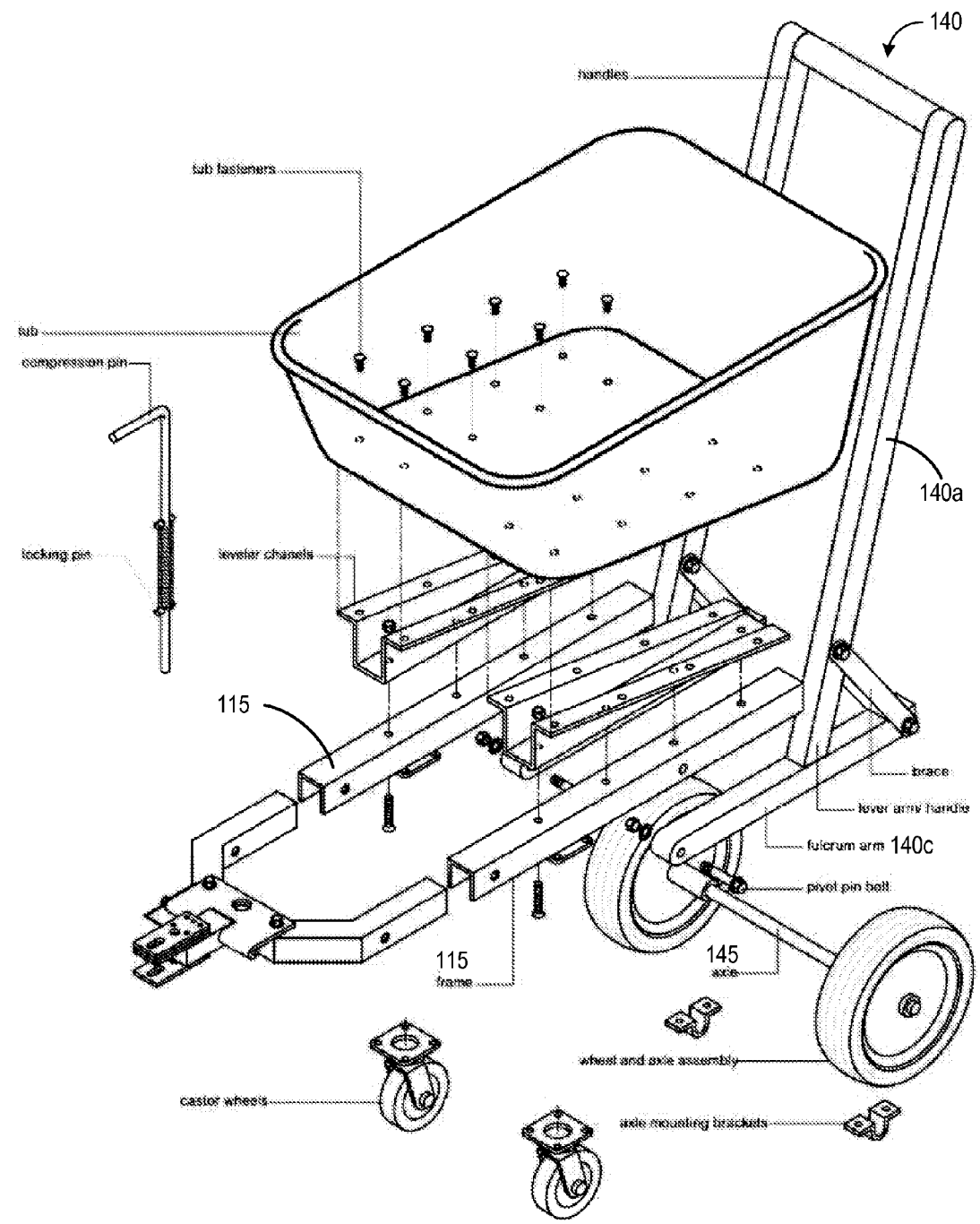

FIGS. 1A-1C illustrate an example implementation of a transport device 100 according to the principles of the present disclosure. The transport device 100 comprises a frontend tongue assembly 110, a tongue adapter 112, a frame 115, a tub 120, levers 125, front wheels 130, back wheels 135, and a dumping assembly 140.

The tongue adapter 112 can be attached to the frontend assembly 110 to attach the transport device 100 to a motor vehicle having a traditional tow bar as described in U.S. patent application Ser. No. 13/541,654 entitled "Floating Hitching System" (i.e., tow bar 140 of FIG. 1 of the '654 patent application), which is incorporated by reference in its entirety.

As shown on FIG. 2A, an example implementation of a tongue adapter 112 comprises a top portion 205 having a hole assembly 210, a bottom portion 215 having a hole 212, and an opening 220 between the top portion 205 and the bottom portion 215. In some implementations, the opening 220 can have a height of up to twelve inches. In some implementations, the opening 220 can have a height greater than twelve inches. In some implementations, the height of the opening 220 can be less than 8 inches. In some implementations, the height of the opening can be based on the size of a wheel of the transport device or the vertical location of the tow bar on the motor vehicle.

In some implementations, top portion 205 comprises three plates 205a,b,c having holes 210a,b,c, respectively. In some implementations, the hole assembly 210 comprises the three holes 210a,b,c.

Figure 2B:
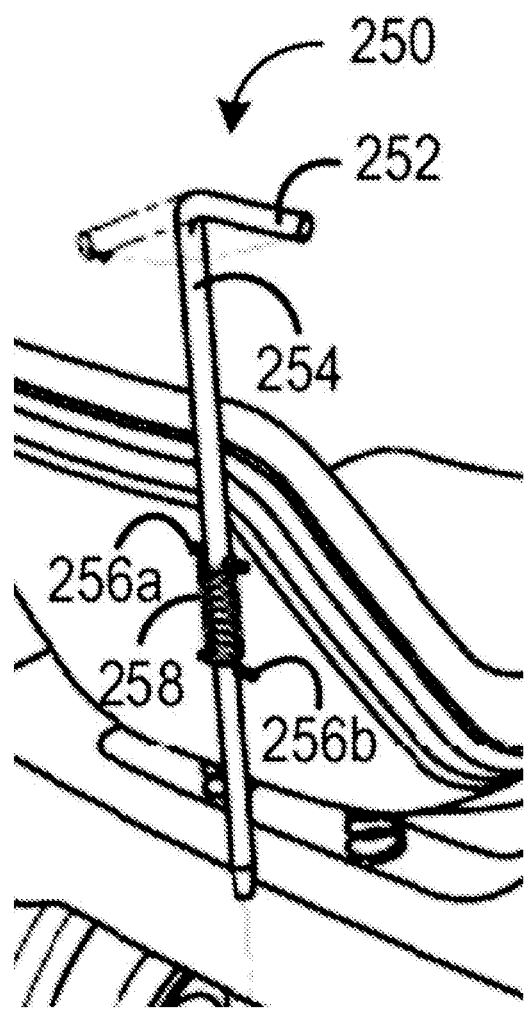
FIG. 2B illustrates a hitching pin assembly.

The tongue adapter 112 is configured to be used with the hitching pin 250 of the '654 patent application, which is reproduced in FIG. 2B.

To hitch a transport device to a motor vehicle using the tongue adapter 112, a tow bar of the motor vehicle is positioned between the top portion 205 and the bottom portion 215 of the tongue adapter 112 (i.e., the tow bar is positioned in the opening 220 of the tongue adapter 112) and the hole of the tow bar and hole 212 of the bottom portion 215 are aligned.

The hole assembly 210 is configured to receive the lower portion of the shaft 254 and the second dowel pin 256b of the hitching pin 250 when the second dowel pin 256b is in a first direction lengthwise. The compression spring 258 is of a sufficient diameter such that the compression spring 258 is blocked by the top portion 205 of the tongue adapter 112. When the bottom of the compression spring 258 rests on the top portion of the tongue adapter 112, the lower portion of the shaft 254 is of a sufficient length such that the end of the shaft 254 can be received by the hole of the tow bar and the hole 212 of the bottom portion 215.

As the handle 252 of the hitching pin 250 is pushed down, the compression spring 258 is compressed, and then the handle 252 of the hitching pin 250 is rotated to position the second dowel pin 256b in a second direction lengthwise to align the second dowel pin 256b with a slot 211 of the plate 205b to receive both ends of the second dowel pin 256b. In some implementations, the handle 252 is rotated 90 degrees from the first direction (that is, the first direction and the second direction are at right angles).

Once the second dowel pin 256b is aligned with the slot 211, the handle 252 is released so that both ends of the second dowel pin 256b can be received by the slot 211, thereby both hitching the transport device to the motor vehicle and securing the hitching pin in place.

In some implementations, the tongue adapter 112 further comprises a connector 225 such as a hasp and a spacer 230. The connector can be any connector adapted to connect the tongue adapter 112 to the frontend assembly 110. The connector 225 attaches to the frontend assembly 110. In some implementations, the connector 225 can be attached to the frontend assembly 110 via bolts as shown in FIG. 2A.

In some implementations, one end of the spacer 230 is positioned between the top portion 205 and the bottom portion 215 of the tongue adapter 112 and the other end of the spacer 230 is connected to the connector 225.

In some implementations, the spacer 230 is attached to the connector 225 via a hinge pin 235 that goes through a hole in the spacer 230 (e.g., hole 230a) and a hole in the connector 225 (e.g., hole 225a).

The horizontal hole 230a in the spacer 230 allows the spacer to rotate about the hinge pin 235, thereby providing a floating action for the tongue adaptor 112.

In some implementations, a torsion spring 235a is provided. One end of the torsion spring 235a may be attached to the connector and the other end may be attached to the spacer 230. The torsion spring 235a may help to keep the spacer 230 level with the connector 225, but also may allow the tongue adapter 112 to rotate as required in the operation of the transport device. The torsion spring may help to maintain the tongue adaptor 112 in a horizontal position when no force is applied to the tongue adaptor, which may help to facilitate hitching the tongue adaptor 112 to the tow bar of a motor vehicle.

In an alternative implementation of the tongue adaptor 112, the top portion 205 comprises one plate having a hole (e.g., plate 205a having hole 210a). Furthermore, plate 215 is modified to have bumps or notches to lock the second dowel pin 256b when the compression pin is rotated 90 degrees and released. In some implementations, the length of the second dowel pin 256b may be less than the diameter of the hole in the tow bar of the motor vehicle. In some implementations, this may be achieved by increasing the diameter of the hole in the tow bar of the motor vehicle. In some implementations, the tow bar of the motor vehicle may be modified by machining a slot or by adding an adapter with the required hole and slot to accommodate the shaft and second dowel pin 256b of the hitching pin 250.

Referring to FIG. 3A, the frontend tongue assembly 110 without the tongue adapter 112 can be used to attach a transport device 300A to a motor vehicle 360 that has been equipped with a floating hitch 240 as described in the '654 patent application. The motor vehicle 360 can be any motorized vehicle, such as a lawnmower or any other motorized vehicle. In this way, the transport device is enabled to be pulled by a motor vehicle.

Returning to FIGS. 1A-1C, in some implementations, the levelers 125 are connected to the frames 115 and can be used to make level the top of a slanted tub 120. Referring to FIG. 3A, leveling the top of tub 305 may be needed for implementations of a transport device 300A that include a level work bench 310. FIG. 3A illustrates a cross-sectional view of an example work bench 310. The work bench 310 may be attached to the handle 307 and can move with the handle when the handle is pushed down to dump the load in the tub, as discussed below.

Figure 3B:
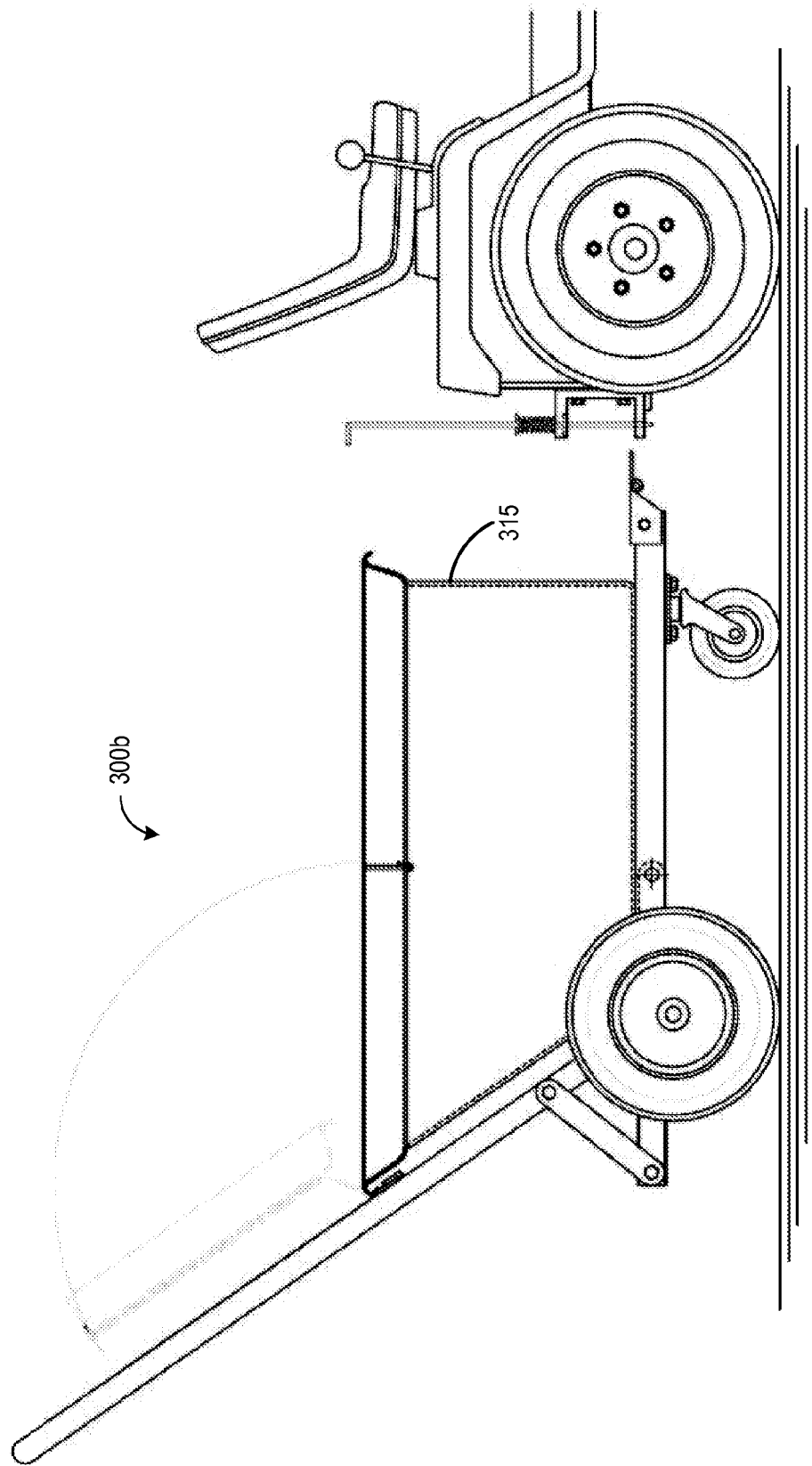
FIGS. 3B and 3C illustrate implementations of a transport device according to the principles of the present disclosure that do not include levelers.
Figure 3C:
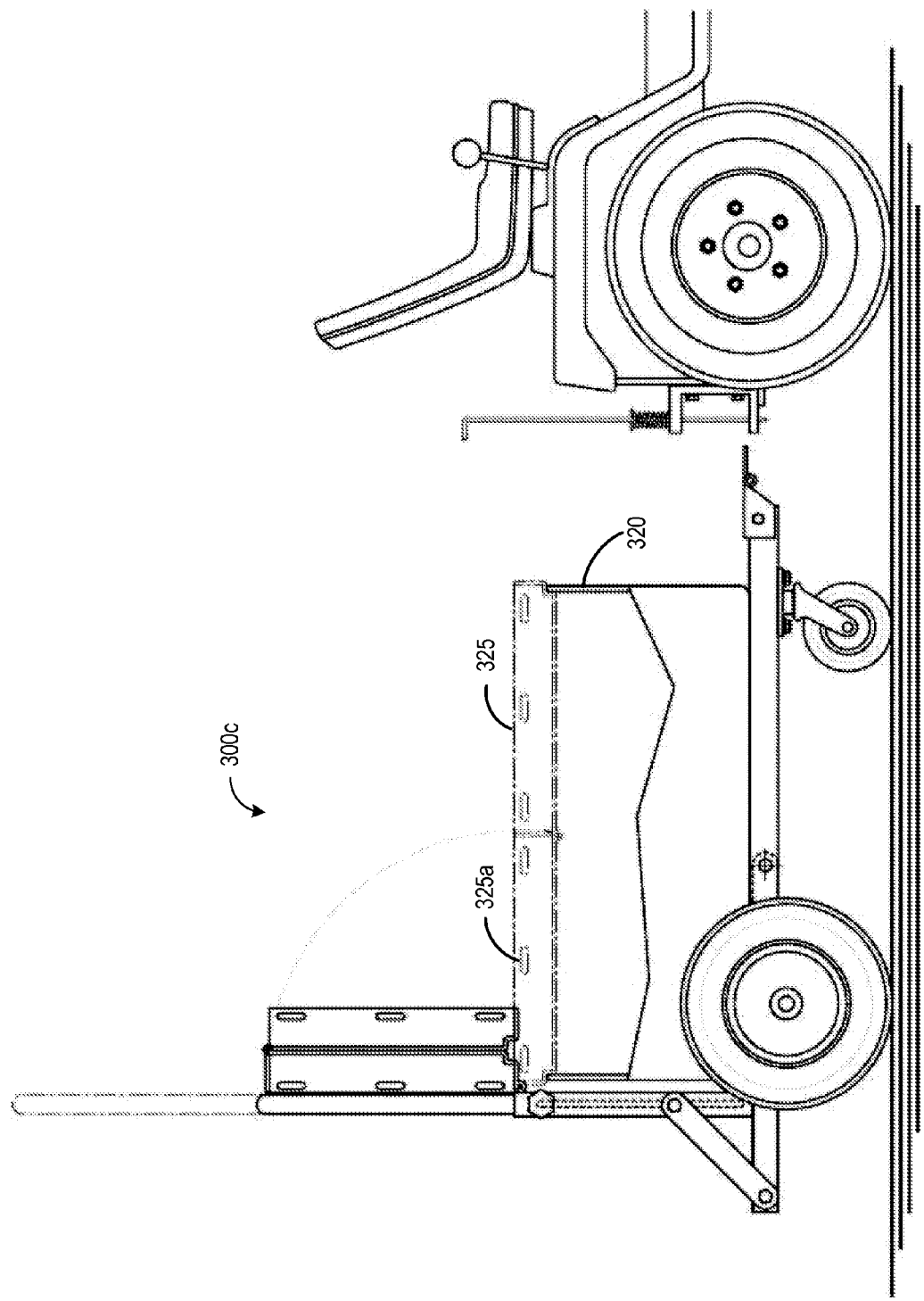

FIGS. 3B and 3C illustrate implementations of a transport device 300b, 300c, respectively, according to the principles of the present disclosure that do not include levelers 125. Flat bottom tubs 315, 320 may be used with such transport devices. FIG. 3C illustrates another example implementation of a work bench 325, including holes 325a to facilitate attaching a rope or bungee cord to secure items in the work bench 325. In an alternate implementation, holes may be included around the top of the tub to facilitate attaching a rope or bungee cord to secure a load in the tub.

As shown in FIG. 1C, the dumping assembly 140 includes handles 140a, braces 140b, and fulcrum arms 140c. It is noted that the details of the dumping assembly 140 on the left side of the figure may not be shown; however, in some implementation, they are a mirror image of the details on the right side of the figure. The fulcrum arms 140c are pivotally connected to the frames 115, respectively, as shown in FIGS. 1B and 1C, for example. In some implementations, the frames 115 are U-channel frames and the fulcrum arms 140c fit inside the U-channel of the frames 115. The frames 115 and fulcrum arms 140c then may be pivotally connected. In some implementations, the back wheels 135 may be connected by an axle 145 and the fulcrum arms 140c may be attached to the axle 145.

In an alternate implementation, the back wheels may be rigid casters that are bolted to and aligned with fulcrum arms 140c, thus eliminating the axle 145. The fulcrum arms 140c then are pivotally connected to the frames 115 as previously described.

FIGS. 4A-D illustrate the dumping function of a transport device according to the principles of the present disclosure. FIGS. 4A-D illustrate a cross-sectional, side view of a transport device and a cut-away of the fulcrum arm inside the frame. It is noted that the details of the transport device on one side are shown; however, in some implementations, the details of the transport device on the other side are a mirror image of the details shown on the one side.

To dump a load in a tub 405 (e.g., tub 120, tub 305, tub 315, or tub 320), an operator can push down on the handles 140a, thereby causing the fulcrum arms 140c to rotate up at a fulcrum point 410 and about a wheel axle 415 and causing the frame 115 to pivot downwardly. In an alternate implementation, when the back wheels are rigid casters, the fulcrum arms 140c rotate about the individual wheel axles of the rigid casters, respectively.

Figure 4A:
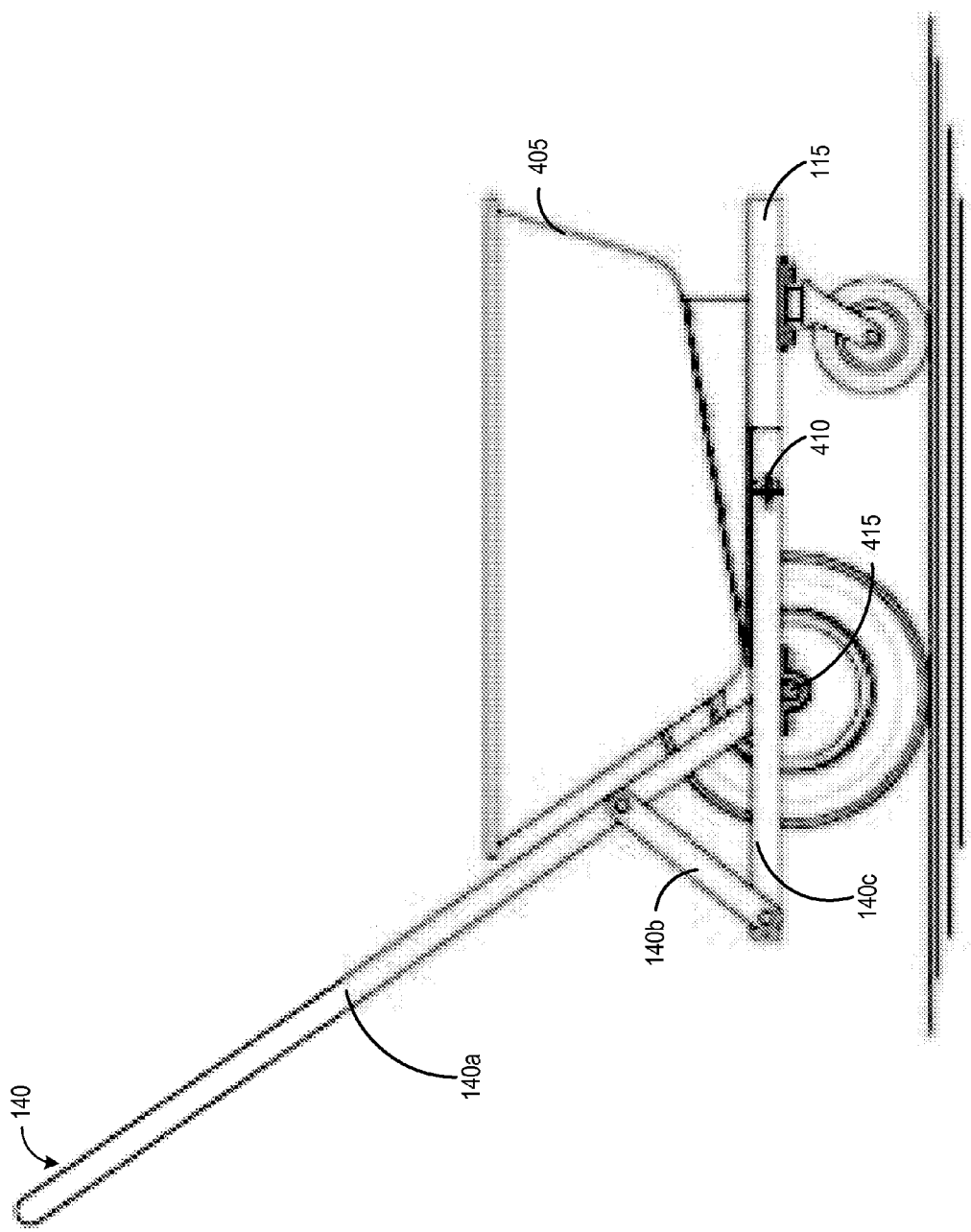
FIGS. 4A-D illustrate the dumping function of a transport device according to the principles of the present disclosure.
Figure 4B:
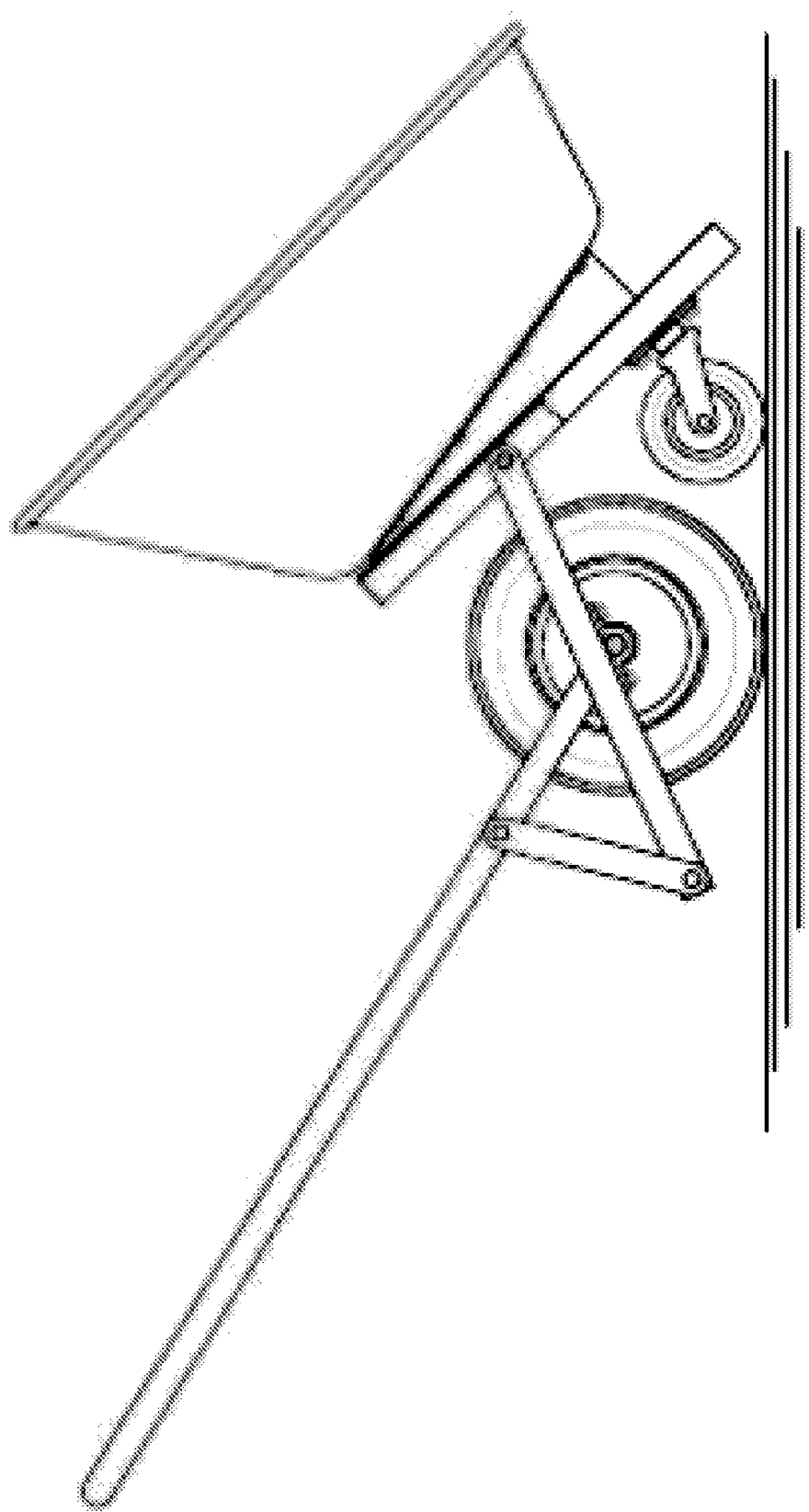
Figure 4C:
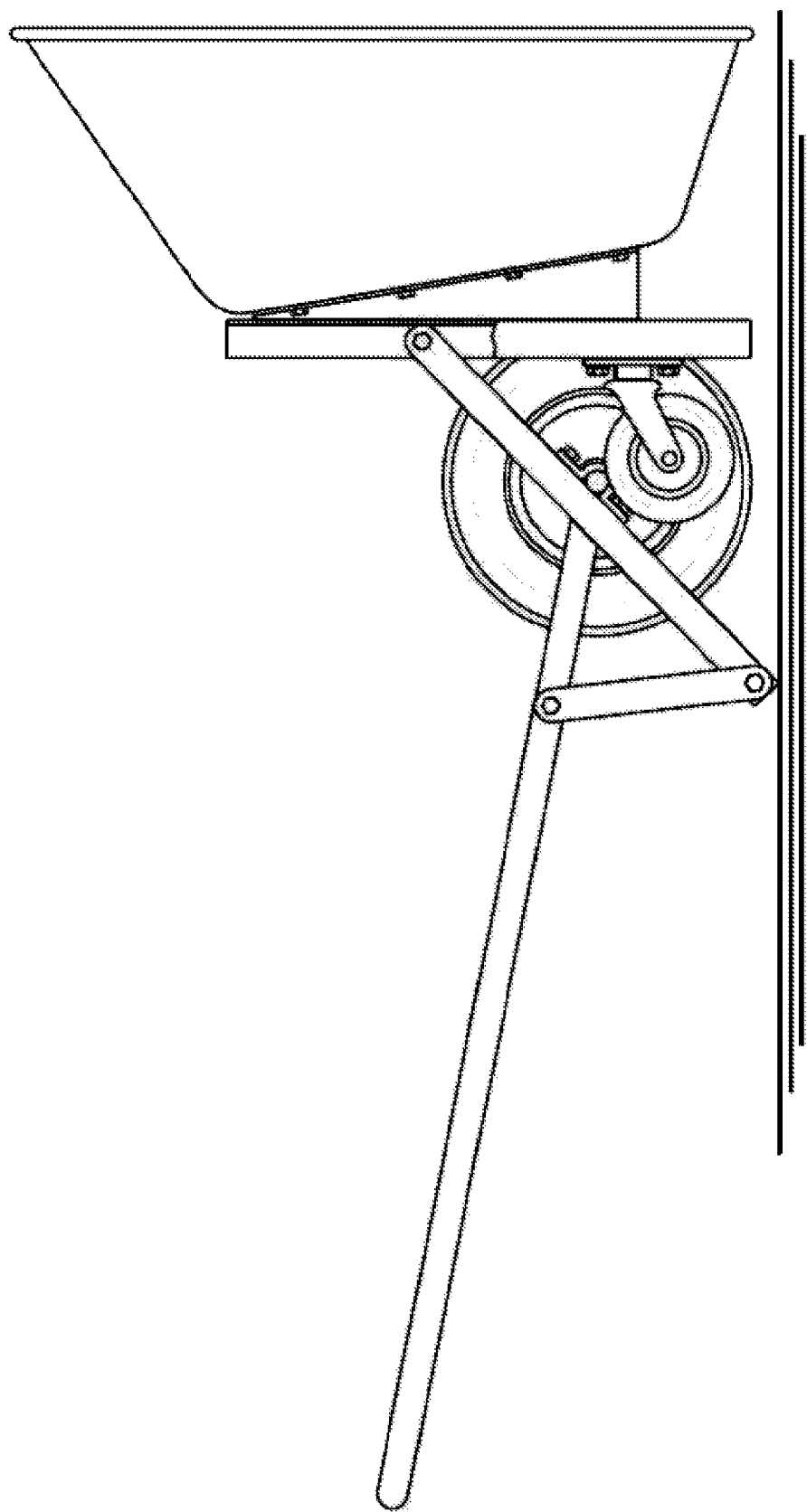
Figure 4D:
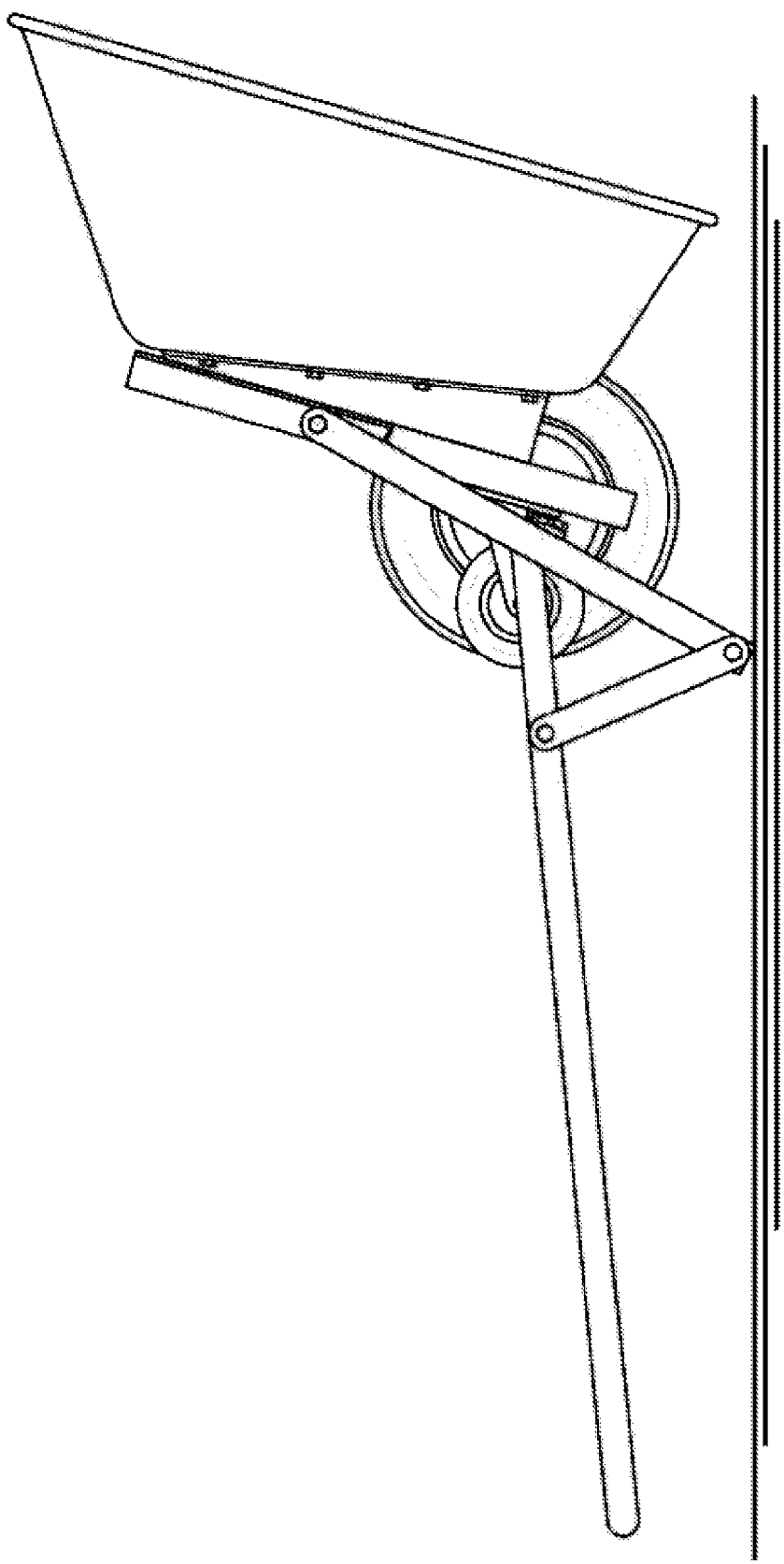

As shown in FIGS. 4B and 4C, the downward pivoting action of the frame 115, to which the tub 405 is attached, can cause the back of the tub 405 to be raised and the front of the tub 405 to be lowered, thereby causing a dumping action.

As shown in FIG. 4C, as the operator continues to push down on the handles 140a, the intersection 420 of the brace 140b and the fulcrum arm 140c may make contact with the ground, thereby causing the transport device to rotate about the intersection 420 while the fulcrum arms 140c continue to rotate up at the fulcrum point 410 and the frame 115 continues to pivot downwardly. Thus, the back of the tub 405 continues to be raised and the front of the tub 405 continues to be lowered, further causing the tub 405 to continue to dump. In some implementations, the frame 115 may rotate beyond 90 degrees from its initial position such that the top plane 422 of the tub 405 slants forward. In this way, the transport device may dump a load more effectively.

In some implementations, the tub may include a gate (not shown) at the front 427 (see FIG. 4B) that can be opened (e.g., by sliding it up) to help facilitate dumping.

Figure 5A:
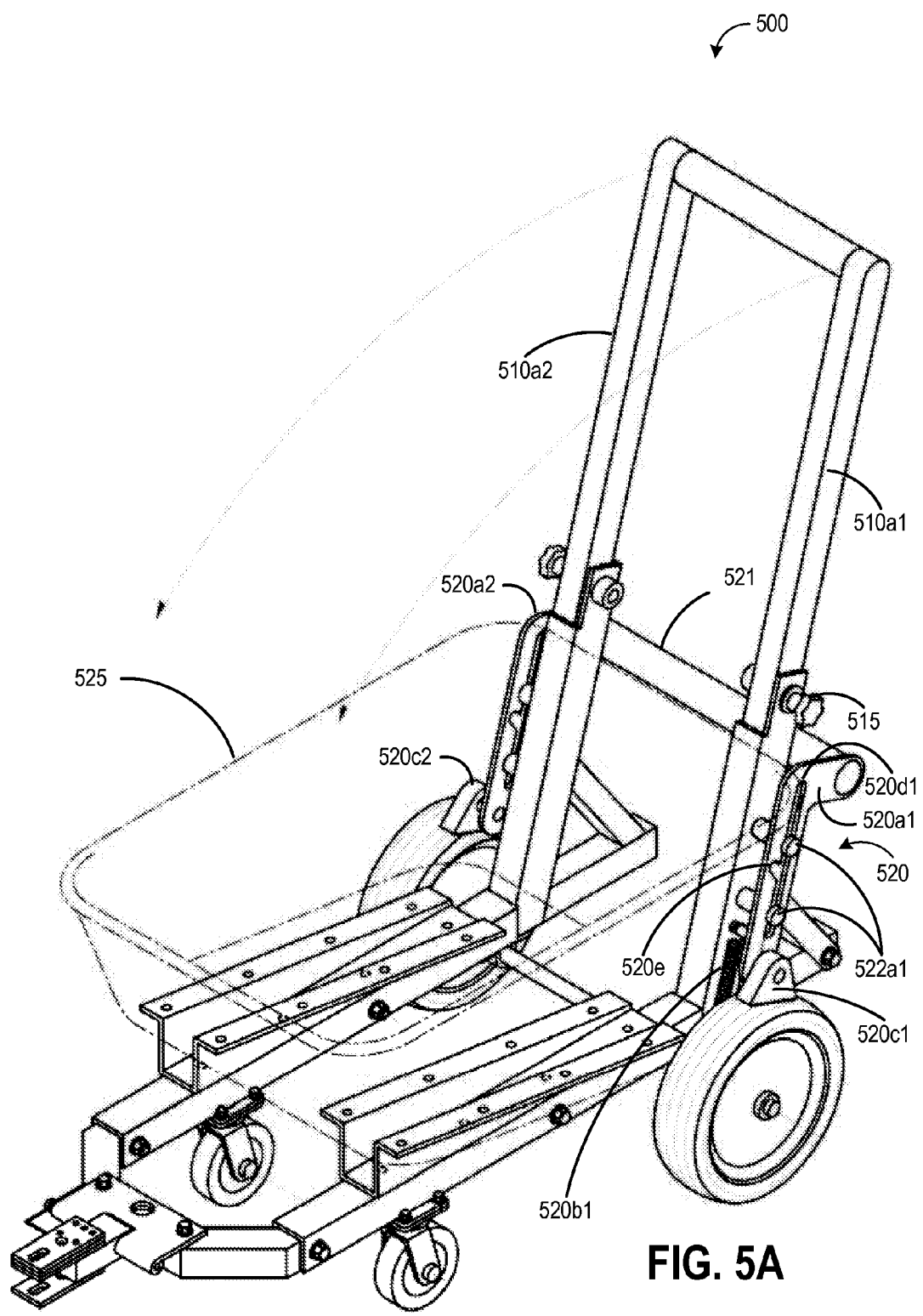
FIGS. 5A, 5C and 5D illustrate another example implementation of a transport device, including a braking system according to the principles of the present disclosure.

FIG. 5A illustrates another example implementation of a transport device 500 according to the principles of the present disclosure. The transport device 500 comprises the elements of the transport device 100, but further includes adjustable handles 510a1, a2 and a braking system 520.

In some implementations, the length of the handles 510a1, a2 may be adjusted by loosening the locking bolts 515a1, a2, adjusting the length of the handles 510a1, a2, and tightening the locking bolts 515a1, a2 to secure the handles 510a1, a2.

Figure 5B:
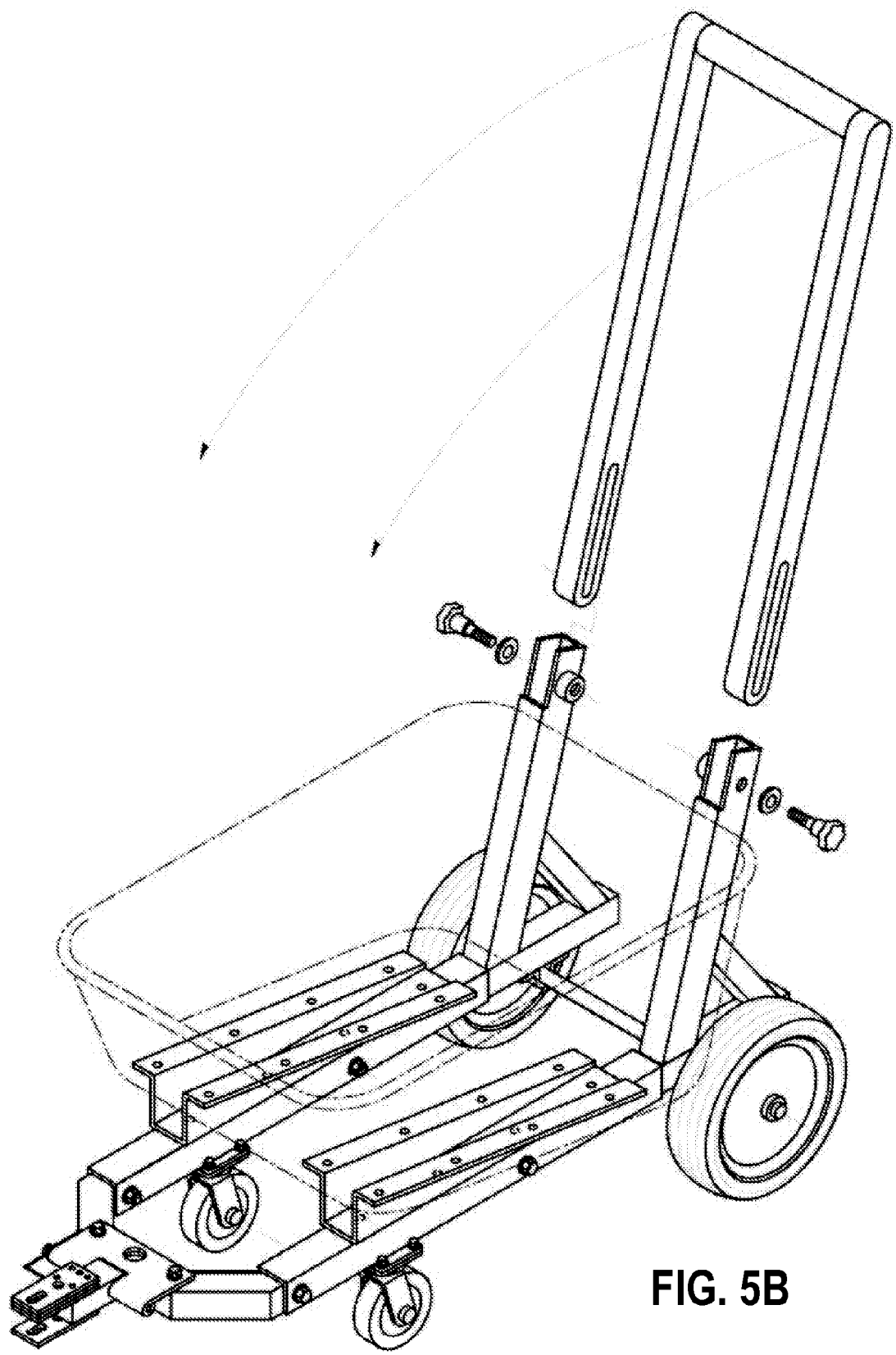

FIG. 5B illustrates an example implementation of the adjustable handles 510a1, a2.

Figure 5C:
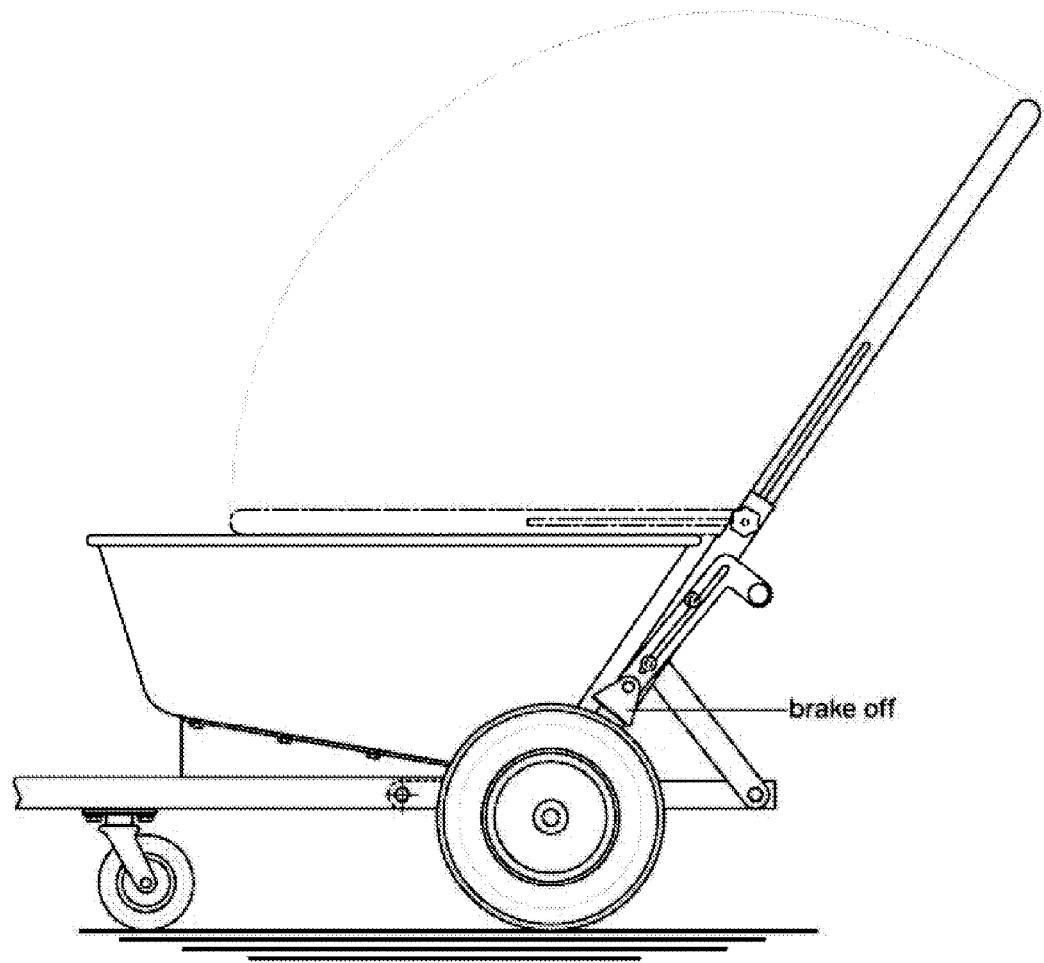

As shown in FIG. 5C, the handles 510a1, a2 can be folded down on top of the tub 525. This can help to reduce the storage space required for the transport device 500.

The adjustable handles 510a1, a1 also can be used to facilitate in the dumping function of a transport device 500. More specifically, to dump a load in the tub 525, the operator may loosen the locking bolts 515a1, a2 and extend the length of the handles for greater leverage during the dumping action. The operator then can push down on the handle to begin the dumping function. At some point, to avoid having to bend the operator's back any further to continue the dumping action, the operator can rotate the handles upward to form a bend in the handle. The operator than can continue to push down on the handle as described above to continue the transport device 500.

In some dumping function of the implementations, the transport device may roll very easily, thus brakes may be provided to help protect an operator when pushing a heavy load up hill, for example. In some implementations, brakes also may be used to park the transport device on a non-level grade, for example.

FIG. 5A illustrates an example implementation of a braking system 520. It is noted that some of the details of the braking system 520 on the left side of the figure are not shown; however, in some implementations, they are a mirror image of the details on the right side of the figure. The brake system 520 includes a handle 521, sliding plates 520a1, a2 attached to the handle 521 on opposite ends; tension springs 520b1, b2 attached to the sliding plate 520a1, 520a2, respectively, on one end and attached to the dumping assembly on the other end; brake shoes 520c1, c2; and a pair of bolt assemblies 522a1, a2.

Sliding plates 520a1, a2 are attached to handles 510a1, a2 via the bolt assemblies 522a1, a2, respectively, to keep the brake shoe 520c properly aligned with the wheel. In some implementations, each bolt assembly comprises a threaded rod connector with a bolt and a stop nut. Each of the threaded rod connectors helps to maintain a space between the handles and the sliding plates. The sliding plates 520a1, a2 contain slots 520d1, d2, respectively, through which the bolts of the bolt assemblies extend. The shafts of the bolts are capped with the stop nuts.

As shown in FIG. 5C, notch 520e may be used to lock the sliding plate in the "up" position by pulling up and back on the handle 521. The resulting tension in springs 520b1, b2 may lock the sliding plates on the bolt shafts extending through threaded rod connectors of the bolt assemblies 522a1, a2. In this position, brake shoes 520c1, c2 may not be in contact with the wheels and the brakes are "off." In some implementations, additional notches may be included to lock the sliding plates in additional positions. For example, a notch can be located such that the brakes are partially "on" to slow down the transport device as it is pushed downhill.

Figure 5D:
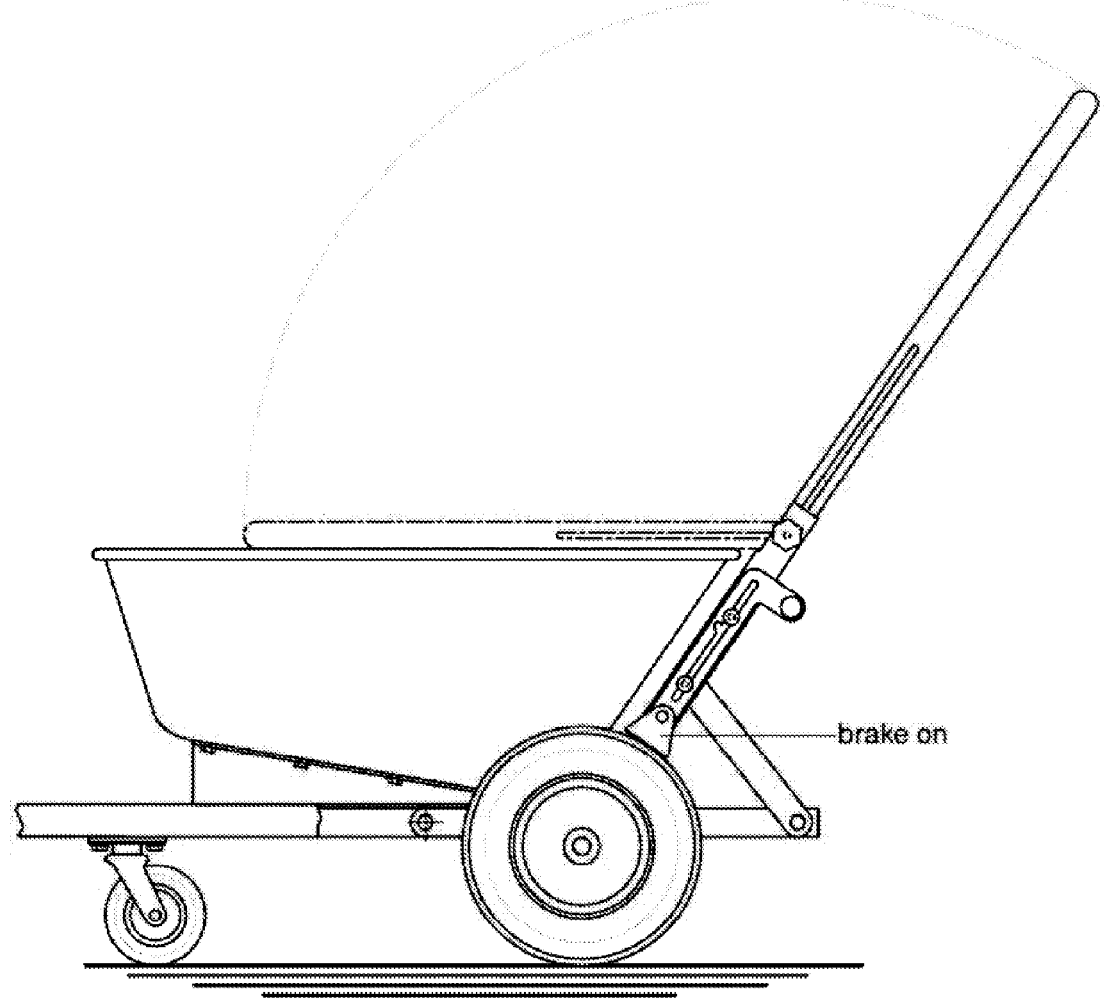

If handle 521 is pulled up and pushed forward, the notch no longer restrains the sliding plate and tension springs 520b1, b2 may pull the sliding plates down, forcing brake shoes 520c1, c2 in contact with the back wheels, thus stopping the transport vehicle. In some implementations, since there is tension in the springs 520b1, b2 in the "off" position, releasing the sliding plates from the notch 520e may result in the brakes immediately being applied. In some implementations, this provides both emergency brakes and regular brakes in the same assembly. In this position, as shown in FIG. 5D, the brakes are "on."

By the operator pushing down on handle 521, additional braking action can be applied above that produced by the tensile springs. By putting the brakes in the "on" position and by lifting up or pushing down on handle 521, an operator can control the transport device when going downhill. This braking design allows the operator to engage the brakes either with his hand or knee.

Four wheels eliminate the side to side symmetry requirements for a loaded wheelbarrow. Incorporation of four wheels allows the tub to be wider without risk of prematurely dumping.

Implementations with swivel casters 130 on the front of the transport device permit the transport device to function as a wagon, thus providing four wheels to carry the load. A typical wagon has a handle or tongue that is attached to a plate that is attached to the wagon bed so that the plate (and the direction of the front wheels) can rotate relative to the bed. An axle is attached to the plate onto which are placed the front wheels. This arrangement allows the wagon to be guided with the handle or the tongue. A wagon attached to a motor vehicle is extremely difficult to back in a desired direction because a wagon tends to jackknife. A transport device with swivel casters on the front can be guided by the tongue just as a wagon can be.

However, the casters are independent of the tongue's position and not dependent as are the wheels of the wagon. The casters swivel to the proper direction from the side pressure that is applied when the tongue is turned. Since the swivel casters are independent of the tongue (but respond to side pressure), transport devices with swivel casters back like a trailer.

Some transport device implementations have either rigid casters or a fixed axle on the front. These transport devices are turned by lifting either the front or back wheels off the ground and swiveling on the other set of wheels still in contact. These implementations may be pulled with a motor vehicle if the relative vertical positions of the tow bar on the motor vehicle and the tongue on the transport device are located so that the front wheels are off the ground when the transport device is hitched to the motor vehicle. In this implementation, the transport device functions as a trailer. If this is not the case, there is a risk of damage to rigid wheels on the front when the transport device is being towed.

Figure 6:
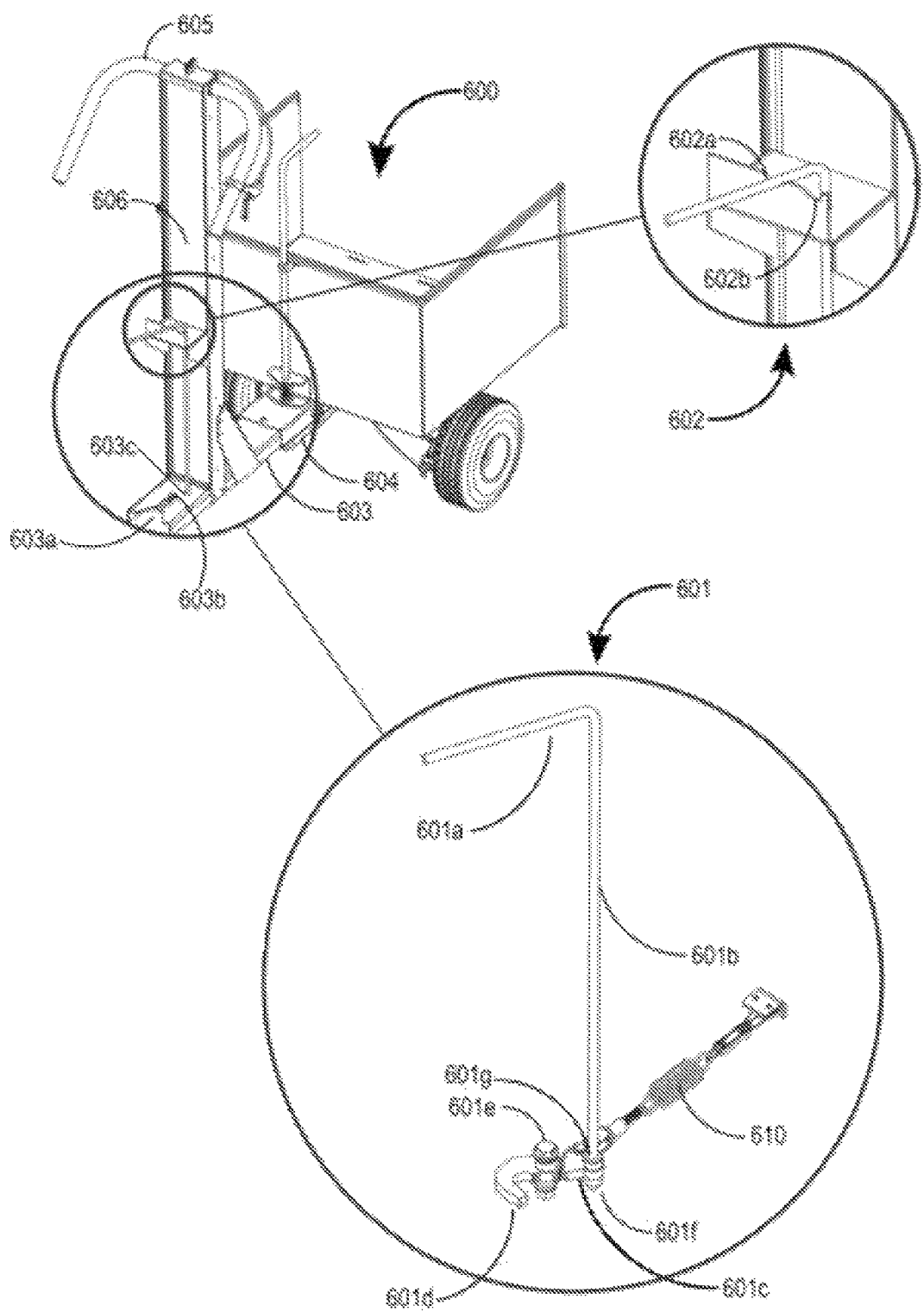
FIG. 6 illustrates the single lift-arm/single fulcrum/single rail transport system.

FIG. 6 illustrates an example implementation of a single-handle 606/single-lever-arm 603/single-main-rail 604 transport system as opposed to the dual-handles 510a1,a2/dual-lever-arms/dual-main-rails transport system shown in FIG. 5A. FIG. 6 also illustrates an example implementation of a bicycle style, secondary handle 605 supported on a primary, upright handle 606 as opposed to the hand-truck style, dual handles 510a1,a2 of FIG. 5A. In addition, FIG. 6 illustrates a different hitching mechanism than FIG. 5A. Some additional features of transport system 600 are not initially shown in order to better illustrate the features of hitching system 601. Additional features are added on following illustrations as they are discussed in the text.

Figure 7A:
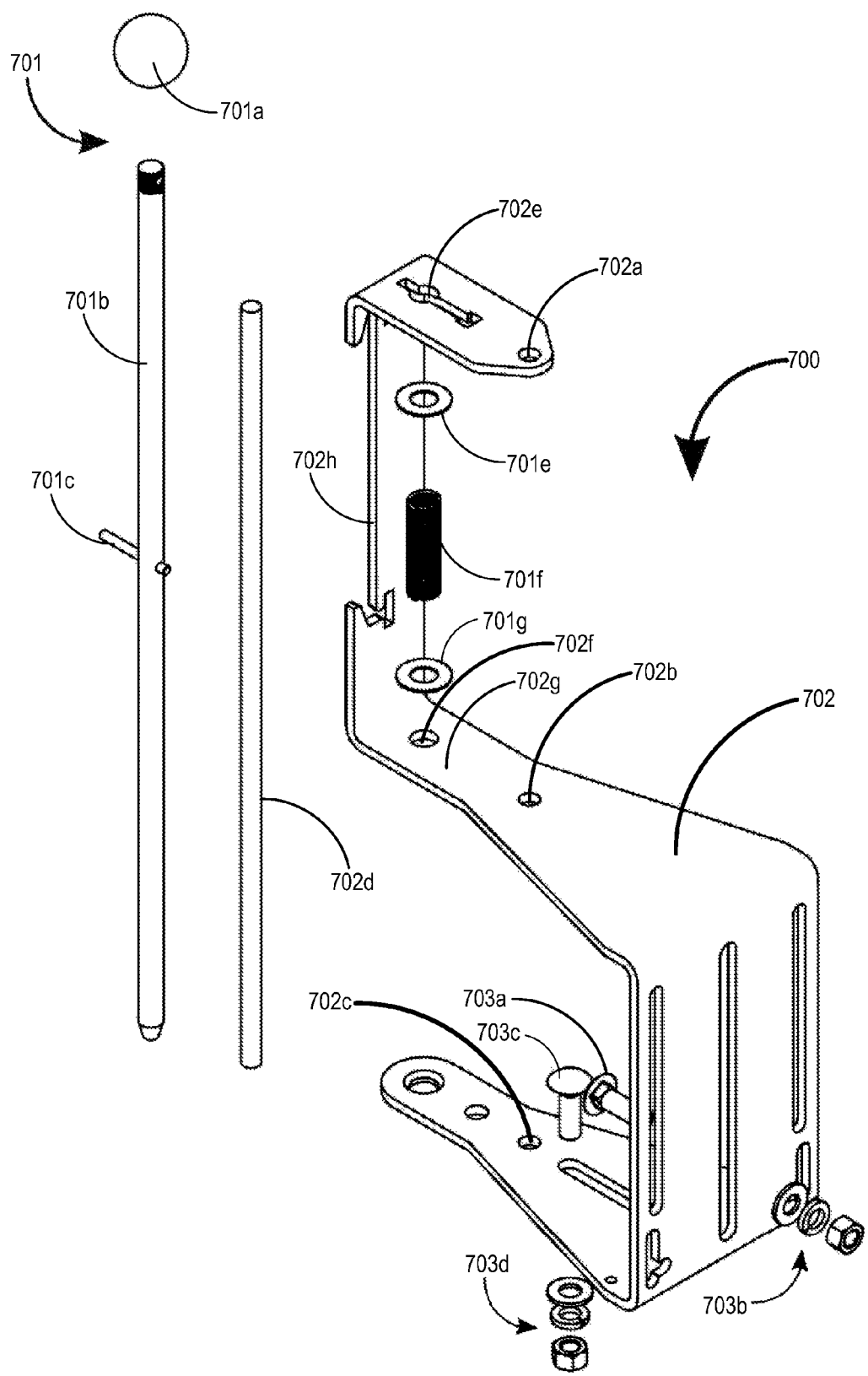
FIGS. 7A-C illustrate the floating hitching system for the towing vehicle.
Figure 7B:
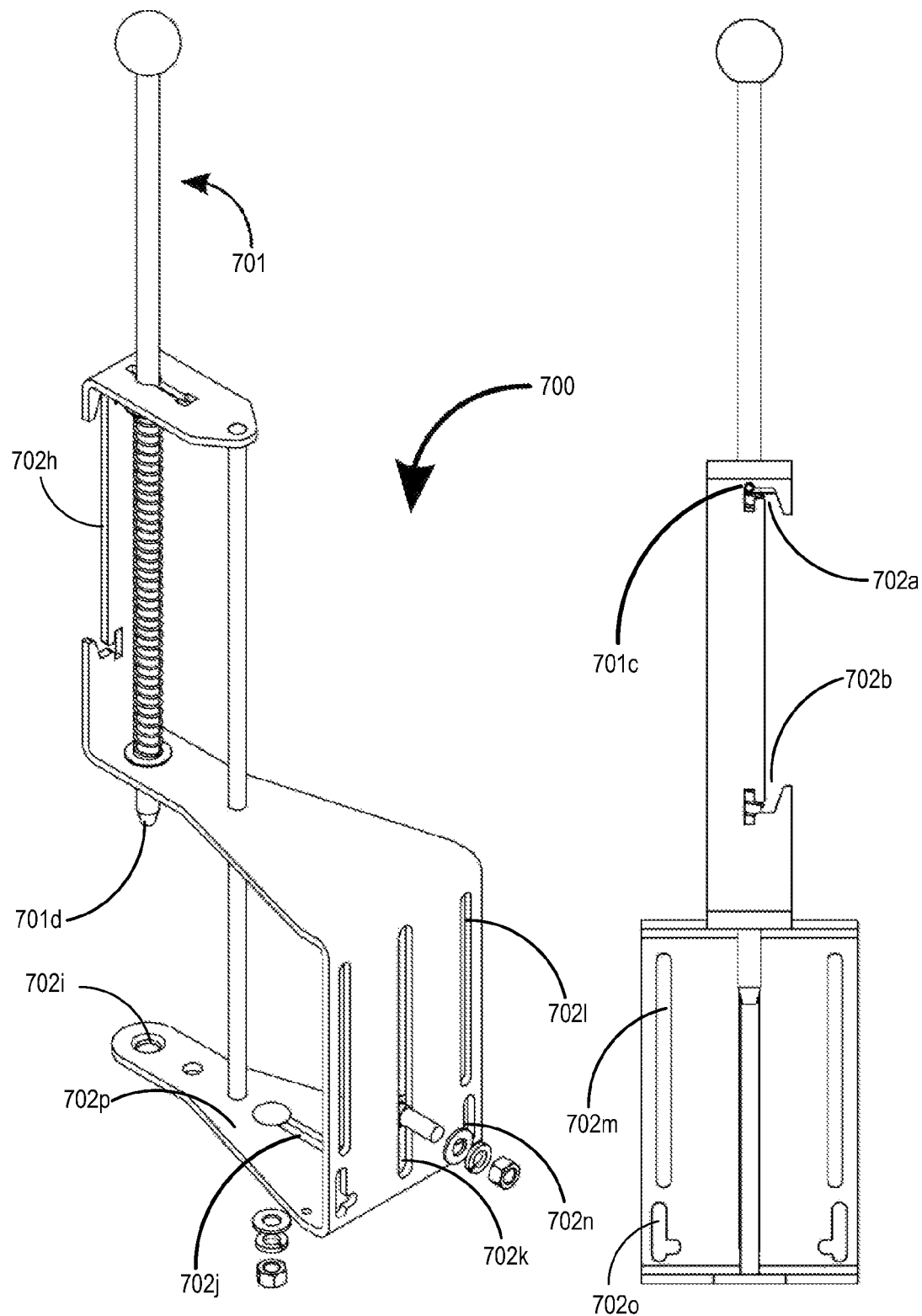
Figure 7C:
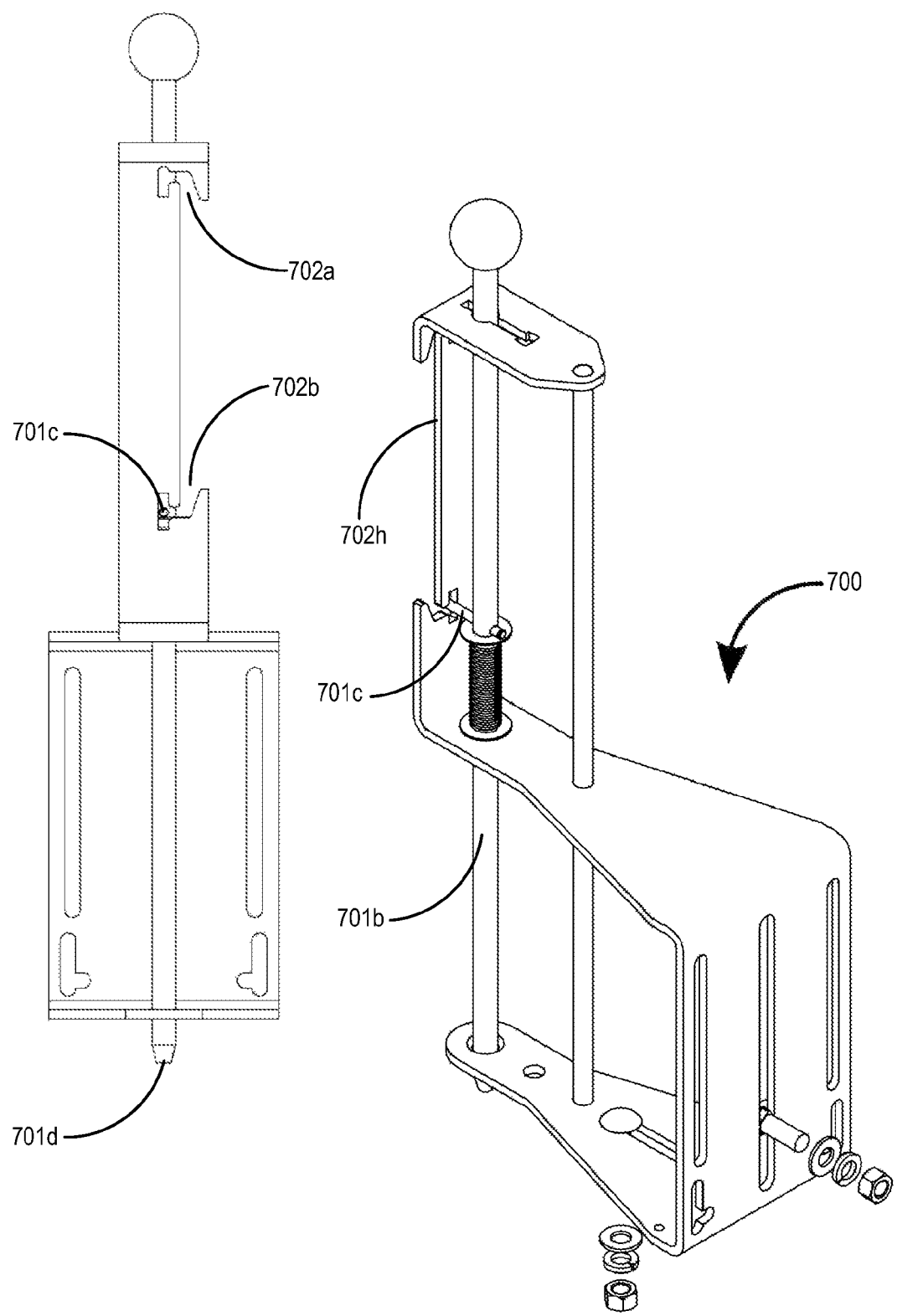

As will be shown in FIGS. 7A-C, hitching system 700 containing vertical hitching pin 701b may be mounted on some towing vehicles with fasteners 703a-d. As the towing vehicle backs up to hitch to transport system 600, the v-shaped groove 603a may guide the vertical pin 701b into the correct position to be clamped in place by hook 601d. (The interplay of the brakes with the hitching sequence is discussed below.)

Hook 601d may be rotated by handle 601a which is attached to shaft 601b, which in turn is attached to gear mechanism 601c which mates with a matching gear on hook 601d. Gear mechanism 601c may be supported by bearing surfaces 601f and 601g located in hole 603c of lever arm 603 and a corresponding (not shown) hole directly beneath 603c in a bottom plate (also not shown). In an analogous fashion, bolt 601e rotates in hole 603b and the corresponding hole (not shown) beneath it in the same plate (not shown). The spring tension in shaft 601b may hold handle 601a in either notch 602a or 602b of mechanism 602.

When handle 601a is in the 602a position, hook 601d will be in the closed position, and hitching transport vehicle 600 may be hitched to any towing vehicle equipped with vertical pin 701b. When handle 601a is in the 602b position, hook 601d will be in the open position and transport vehicle 600 may be unhitched.

Figure 12:
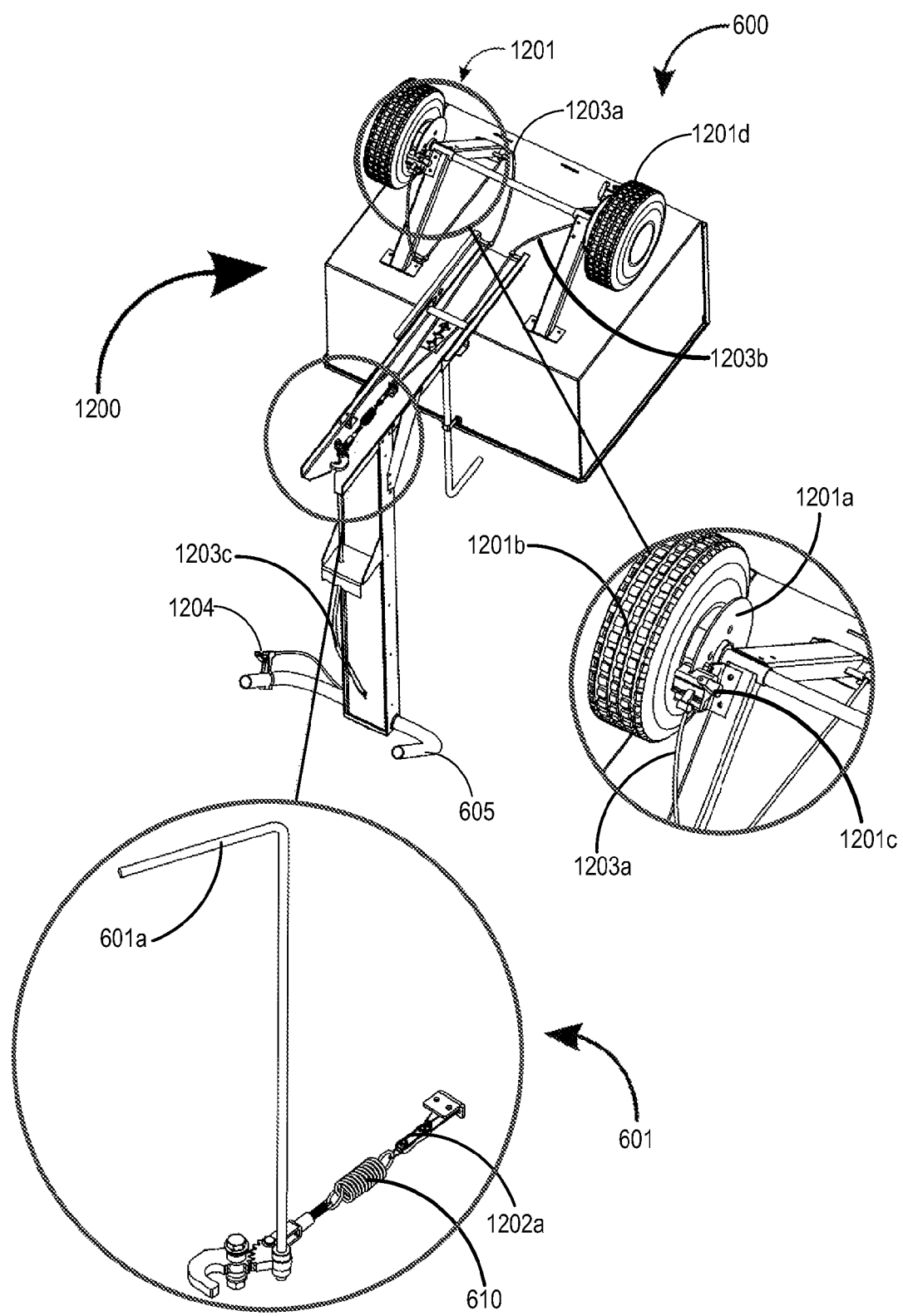
FIG. 12 illustrates the braking system for the single fulcrum/single rail transport system.

As is illustrated in FIG. 12, positioning handle 601a in position 602a reduces the force on spring 610 and the brakes for vehicle 600 are "OFF". Correspondingly, positioning handle 601a in position 602b stretches spring 610 and the brakes are "ON". When hitching transport system 600 to a towing vehicle, handle 601a may be placed in position 602b which turns "ON" the brakes, opens hook 601d and holds transport 600 stationary as hitching pin 701b goes snugly into grove 603a. Moving handle 601a to 602a may turn "OFF" the brakes and may close hitching hook 601d around hitching pin 701b. Thus, handle 601a can turn "OFF" the brakes of transport 600 so that a towing vehicle may tow transport system 600. Alternatively, handle 601a can turn the brakes "ON" and unclamp hook 601d from around hitching pin 702b so that the towing vehicle may drive away, leaving transport system 600 behind.

Positioning mechanism 602 midway up primary handle 606 may permit transport 600 to be hitched or unhitched while the operator is seated on the typical towing vehicle. Also, vehicle 600 may be hitched or unhitched by the operator standing on the ground without having to bend down, as is the case with the conventional, u-tongue/tow bar hitching system. In addition, the floating hitching system and accessories being illustrated in FIGS. 6 to 11B may be faster and easier to hitch or unhitch than existing, prior art hitching systems.

FIG. 7A illustrates the components of a hitch that may be mounted on most towing vehicles. Item 701a of assembly 701 may be a screw-on round knob that may be used to operate hitching system 700. Shaft 701b may form the vertical pin to which transport 600 may be hitched or unhitched. Dowell or rolled pin 701c may control the vertical position of shaft 702b as is illustrated in FIGS. 7B,C. Shaft 702d may be welded at three locations 702a-c to the main frame 702 and thus provide added strength to the 700 assembly. Dowell or rolled pin 701c, washer 701e, compression spring 701f and washer 701g may be used to lock assembly 701 in the desired position of either "UP" or "DOWN". Compression spring 701f's compression and physical parameters are specified so that shaft 701b may be pushed down and locked in the position 702b with less than thirty five pounds of force on knob 701a, that it will have the full travel of edge 702h and that it will exert no less than two pounds of upward force when locked in notch 702a.

As is illustrated in FIG. 7A-c, assembly 701 may be assembled and inserted sequentially into slot 702e at the top of mainframe 702, washer 701e, compression spring 701f, washer 701g, then into hole 702f of middle plate 702g and finally into hole 702i of bottom plate 702p. Once Dowell pin 701c of assembly 701 is through slot 702e, assembly 701 may be turned back so that Dowell pin 701c may slide along edge 702h. By pushing or pulling on knob 701a and turning assembly 701, Dowell pin 701c may be positioned in notch 702a (the up position as is illustrated in FIG. 7B) or notch 702b (the down position as is illustrated in FIG. 7C).

As is illustrated in FIGS. 7A-C, pushing down on knob 701a may lower beveled end 701d of shaft 701b so that it mates with and inserts into hole 702i. If Dowell or rolled pin 701c is held firmly against edge 702h at the same time, then 701c may be inserted into slot 702b. as shown in FIG. 7C. Shaft 701b's and hole 702i's O.D. and I.D. diameters, respectively, may be specified so that shaft 701c slides easily but snugly into hole 702i. With shaft 701b in the down position, vertical pin 701b is available so that hook 601d may hook around it and hitch transport 600 to the towing vehicle.

In some example implementations (according to the back plate configuration of the towing vehicle) two or three selected slots from slots 702j-o of FIG. 7B may be selected to mount hitch system 700 onto the towing vehicle. Carriage bolts 703a,c of the proper size to fit and slide in the applicable slots 702j,k may be selected to fasten hitch 700 to corresponding plates on some example towing vehicles. Slots 702j,k may allow a specific bolt to mate with a corresponding hole in the back plate of the example, towing vehicle Specifically, bolt 703c may be inserted through slot 702j and into the tow bar hole of a towing vehicle and then secured with fender washer, lock washer and hex nut stack 703d below the tow bar. Bolt 703a may be inserted through slot 702k and into an existing or drilled hole in the back plate of the towing vehicle and secured in an analogous fashion with fender washer, lock washer and hex nut stack 703b. The use of a properly sized carriage bolt for the corresponding slot may keep the bolt from turning as the hex nut is securely tightened.

In some example implementations, the back plate of many towing vehicles may not be planar in the vertical direction or contain a hole that aligns with vertical slot 702k. The back plate may have holes aligned with two or more slots 702l-o, have a hole aligned with slot 702k, be at an angle, have a vertical offset or be missing all together. The mounting of hitch 700 with bolt 703a may require spacers of different lengths and/or angled ends for different towing vehicles. In some examples, slots 702l-o may be used to fasten hitch 700 to the towing vehicle's back plate when they align with corresponding holes in the back plate using appropriately sized fasteners. When the back plate is absent, various bracket or other assemblies may be used to attach the back of hitch system 700 to the back of a towing vehicle. The features of hitch 700 and the use of different length bolts and spacers or brackets may make hitch 700 somewhat universal and applicable to a wide range of towing vehicle models and types.

A path for users to transition from the old standard to the new without having to scrap valuable equipment in inventory may facilitate a new standard being accepted commercially.

FIGS. 8A,B illustrate how the standard u-tongue 800 assembly may be hitched to a floating hitch 700, provided the holes 802a and 801a in the u-tongue have a larger internal diameter than the outer diameter of shaft 701b. Bottom plate 702p of hitch mainframe 702 acts as a conventional tow bar and fits into opening 801d for insertion of shaft 701b.

Figure 9A:
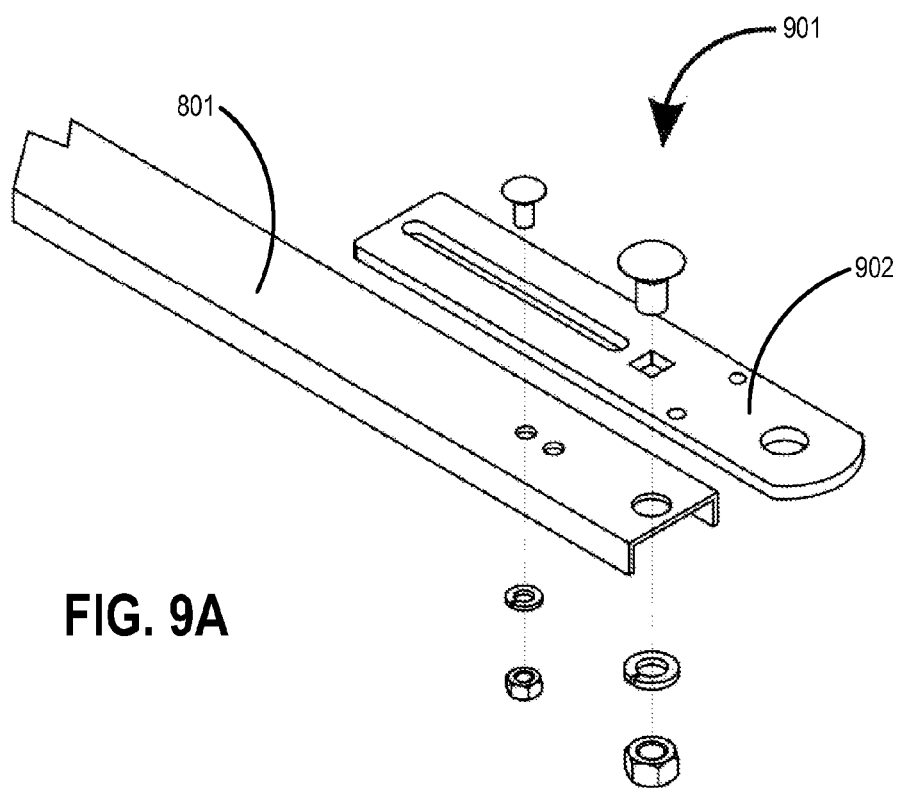
FIGS. 9A-B illustrate converting a u-trailer tongue to a floating tongue.
Figure 9B:
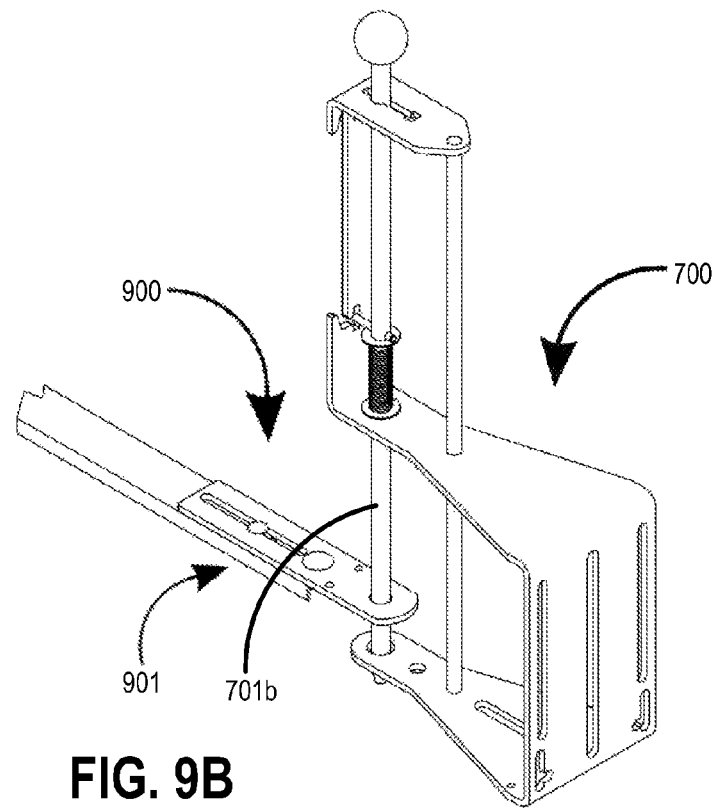

FIG. 8C illustrates how the standard, commercial u-tongue 800 assembly can be disassembled to leave tongue 801 containing holes 801a-c, bracket 802 and hardware 803a-f. FIGS. 9A and 9B illustrate how floating tongue adaptor 902 may be mounted on tongue 801 (using properly sized hardware) to convert it to the floating tongue assembly 901 for hitching to floating hitch 700 with shaft 701b. Conventional u-tongue 800 is thus converted to floating tongue 901 so that hitched assembly 900 may be assembled.

Figures 10A, 10B:
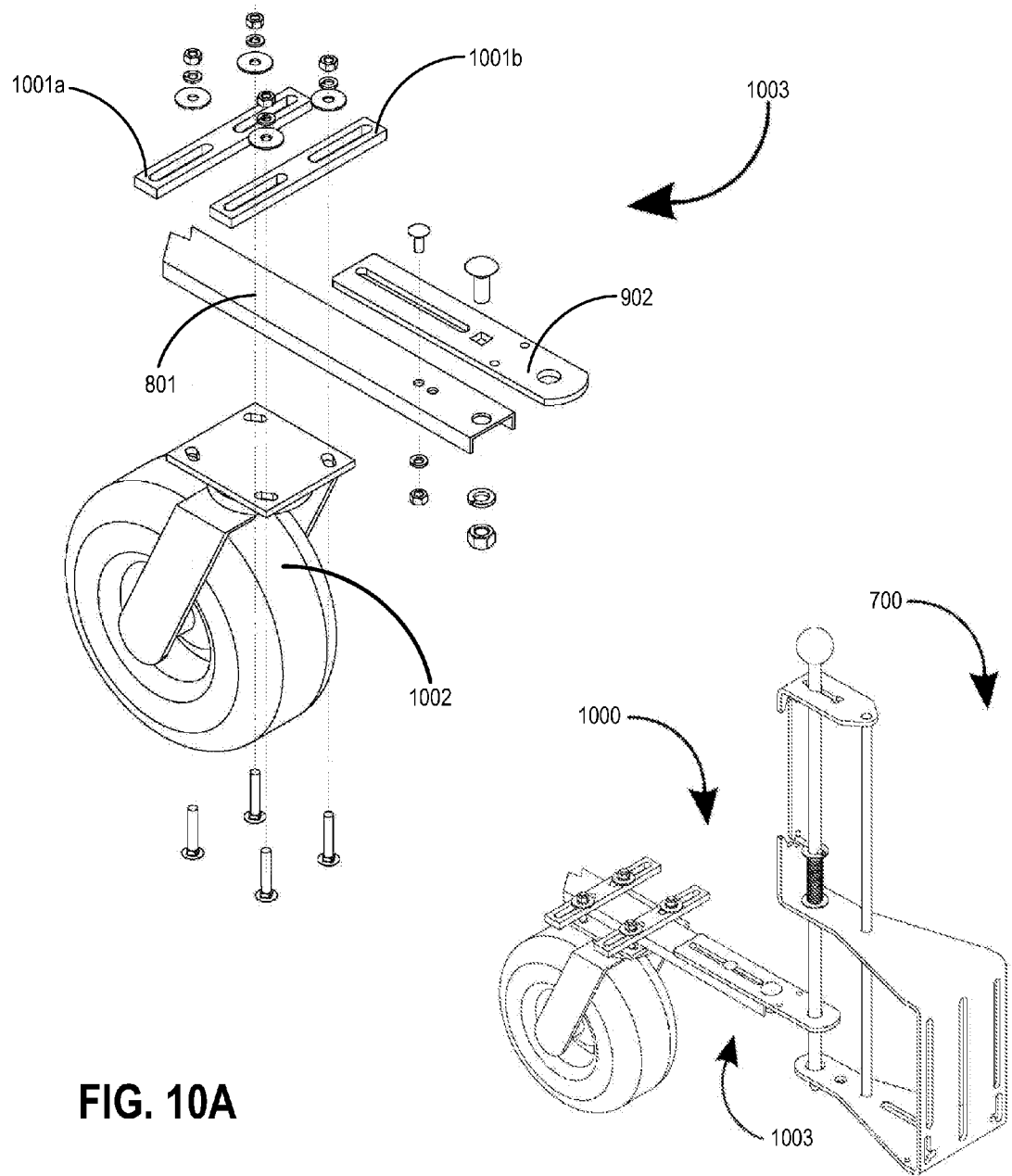
FIGS. 10A-B illustrate utilizing a swivel caster with a floating tongue.

As illustrated in FIGS. 10A,B, tongue 801, swivel caster 1002, floating tongue adaptor 902, properly sized fasteners, and caster adapter plates 1001a,b may be assembled to produce floating hitched assembly 1003. Assembly 1003 may in turn be hitched to floating hitch system 700 to produce hitched assembly 1000 that floats when being towed. When swivel caster 1002 is attached to the u-tongue of a conventional hitching system, two harmful things may happen. First, ruts may be produced in the lawn on which it is being used. Second, if the caster hits an obstacle such as a low stump or a root when on a heavily loaded, u-tongue trailer at lawnmower speed, then the caster may be severely damaged or knocked off entirely. To prevent this, the tongue of the hitched assembly 1000 may float up when it encounters an obstacle or a grade; therefore, both problems may be eliminated.

Figure 11A:
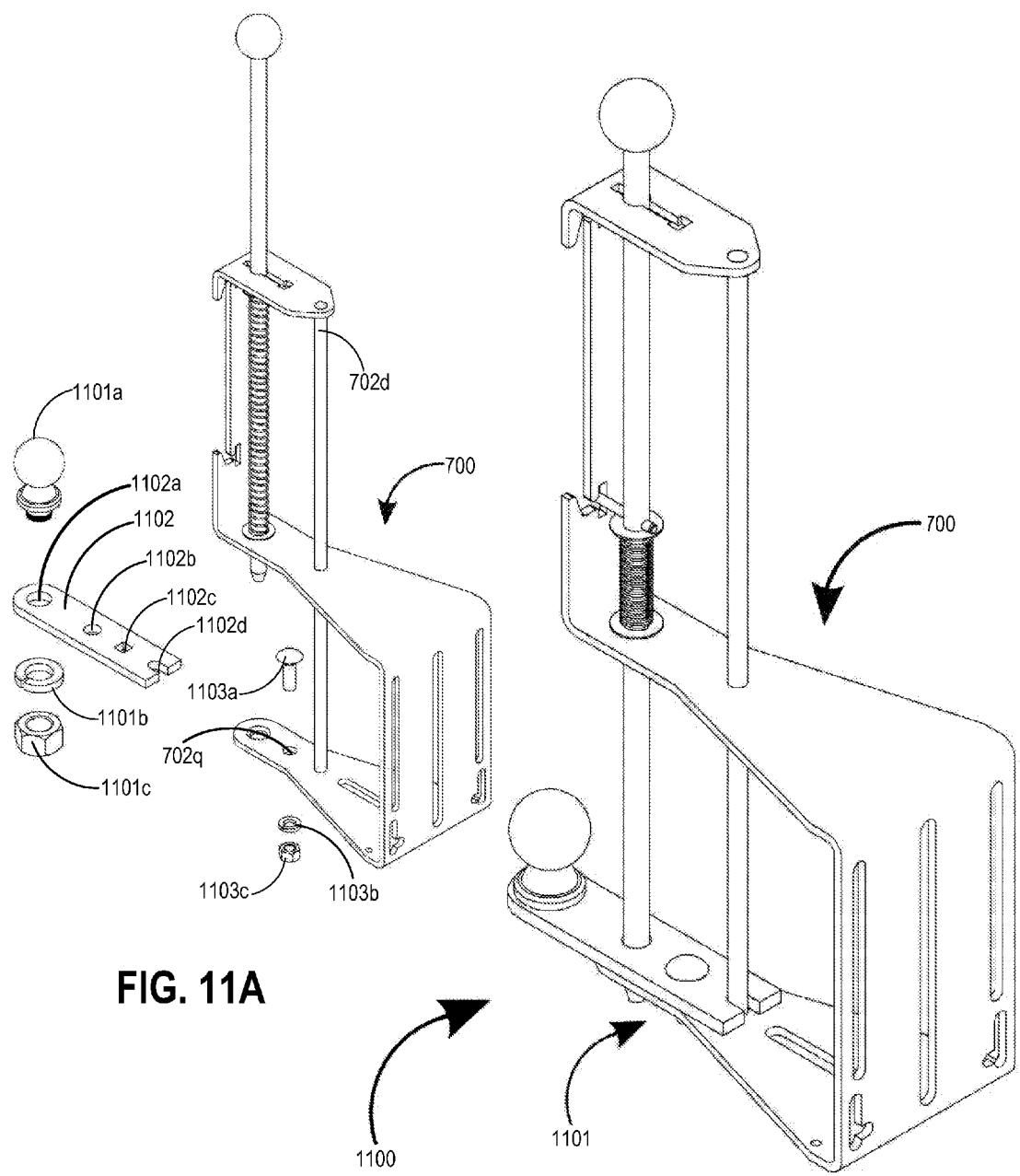

FIGS. 11A,B illustrate how ball hitch 1101a may be attached with fasteners 1101b,c to adaptor 1102 containing holes 1102a-c and notch 1102d to produce ball hitch adaptor assembly 1101. Adaptor assembly 1101 may in turn be mounted onto hitching system 700 to produce assembly 1100 that may allow a trailer with a conventional ball hitching system to be hitched to floating hitch 700. This may allow a smaller towing vehicle, such as a riding lawn mower, to relocate, road-capable trailers to the back of a lot where a road-capable towing vehicle, such as a pickup truck, may not go.

FIG. 12 illustrates an alternate brake implementation example (braking system 1200) for a transport system vehicle such as 600. Wheel brake assembly 1201 may consist of a circular brake drum 1201a attached to the hub of wheel 1201b, brake caliper 1201c, and a wire in a sheath control cable 1203a. The braking system for wheel 1201d is analogous and may be controlled by cable 1203b. Cables 1203a,b may be united at position 1202a which may be controlled by tension spring 610.

Referring back to FIG. 6, the brakes for wheels 1201a,d must be off when handle 601a is in hitched position 602a. As is illustrated in FIG. 12, cables 1203a,b may be routed and mounted so this is true. Caliper 1201b may be selected/configured for internal spring loaded brakes "OFF" when no tension is being applied by cables 1203a,b. When tension is applied to cables 1203a,b by spring 610, internal spring tension of calipers on wheels 1201b,d may be overcome, forcing the brakes "ON". When transport system 600 is utilized in the manual mode (not hitched to a tow vehicle) and handle 601a is in the unhitched position with the brakes "ON", the brakes may be turned off by depressing spring loaded, "dead person", safety switch 1204. Depressing switch 1204 may pull the wire of cable 1203c which is attached to spring 610 at point 1202a. Thus, switch 1204 may counteract the tension of spring 610 and turn brake system 1200 "OFF". If transport system 600 were to escape from the operator going downhill, spring loaded switch 1204 would be released and the brake system 1200 would be turned "ON" from the tension in spring 610 and may stop transport 600. When the transport system is being manually operated on level ground, handle 601a may be switched to the hitched position 602a so that switch 1204 on handle arm 601a may not have to be depressed for the transport to roll.

Braking system 1200 may be used both as an emergency brake, an operational brake and a parking brake. Braking system 1200 may also be used to apply partial braking pressure to control transport 600's speed, when it is being rolled down hill under a heavy load.

Figure 13A:
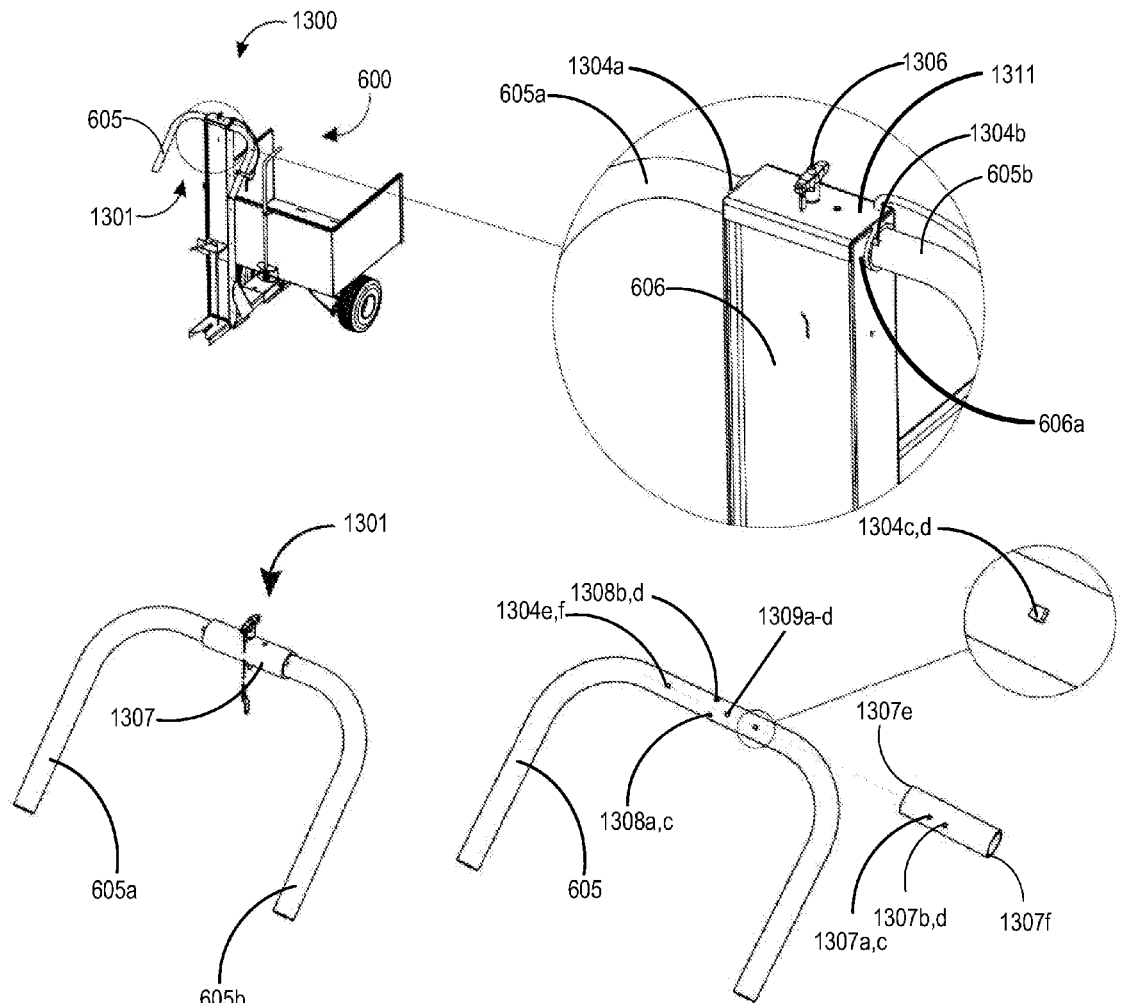
FIGS. 13A-B illustrate the adjustable bicycle handle.

FIGS. 13A,B illustrate an alternate implementation example of an adjustable handle system, such as 1300, for a transport system 600. Handle 605 may be adjusted 360 degrees in 45 degree increments. This allows handle 605 to be positioned for the height of the operator and/or the operation being performed, such as dumping, pushing on level ground, or pushing up a hill. Switch 1204 may be rotated or switched from handle arm 605b to 605a as needed for the operator's ergonomic requirements, such as being left handed.

The position of handle 605 may be controlled by mechanism 1302 as shown in FIG. 13A. Handle 605 (initially a straight tube) may have two sets of four holes (holes 1308a-d and 1309a-d) that are rotated 45 degrees and spaced a specified distance from each other. Two subsets of two holes of each set of four are drilled in tube 605's center and rotated 90 degrees from each other. Analogous holes 1309a,c (c not shown) may be drilled at a negative 45 degrees rotation and offset a specified distance to and from hole pair 1308b,d. Holes 1309b,d (b & d not shown) may be drilled at a plus 45 degrees rotation and offset the same amount as holes 1309a,c from holes 1308b,d.

Aligned, through the tube holes 1307a,c and 1307b,d may be drilled along the center line of tube 1307 at the same relative locations, zero rotation and spacing as holes 1308b and 1309a. In some implementations, a second set of aligned, through holes 1310a-d (not shown) may be drilled in tube 1307 in the same relative locations as 1307a-d but rotated 90 degrees around tube 1307. For some operators, holes 1310a-d may provide a more ergonomic situation for inserting pin 1306 as it may be inserted from the front rather than the top.

Square, through holes 1304c-f, with the same relative spacing as the length of tube 1307, may be cut into tube 605. Tube 1307 may then be slid over tube 605 and locked in the center of tube 605 by insertion of square keys 1304a,b. Relative diameters and spacing may be specified so that tube 605 turns smoothly but firmly inside tube 1307, with surfaces 1307e,f riding against keys 1304a,b, respectively. Tube 605a,b may then be bent to produce assembly 1301. In some alternate example implementations, another tube 605a-b may be welded between arms 605a,b that may both strengthen assembly 1301 and be used to control transport system 600. In some alternate example implementations, square keys 1304a,b may be extended on the lower side of handle 605 so that sliding stops can temporarily prevent handle 605 from turning more than 45 degrees down from the vertical but is free to turn in the opposite direction with pin 1306 removed. This permits the operator to pull down on tube 605a-b until it is below the operator's waist and then rotate handle 605 up and push down on handle 605 to complete the dump. This operation prevents the operator from having to bend as low down to complete the dump as would be otherwise.

Ascertaining that arms 605a,b are aligned vertically with handle 606 and that pin, 1306 is inserted vertically into tubes 1307 and 605, assembly 1301 may be inserted and centered into slots 606a,b (b not shown) of primary handle 606. Cap 1311 with corresponding slots may be placed over assembly 1301. The ends of tube 1307 may then be securely welded to the primary handle 606 and cap 1311. At the same time, handle 606 may be securely welded to cap 1311. Thus, tube 1307 is fixed firmly in one position and handle 605's rotation may be controlled by pin 1306.

The procedure for adjusting the rotation angle of secondary handle 605 relative to primary handle (or upright beam) 606 may be to remove pin 1306, adjust handle 605 to the desired 45 degree increment and then reinsert pin 1306 into hole pair 1307a,c or 1307b,d as applicable.

Figure 13B:
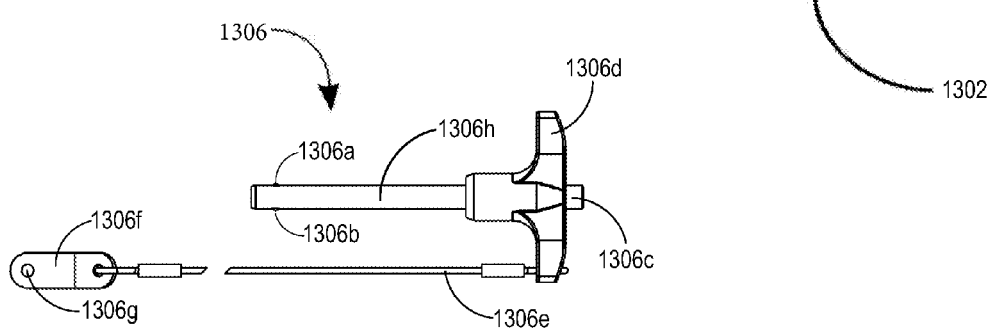

FIG. 13B illustrates the functions of pin 1306. By holding the handle 1306d with the fingers of one hand and pushing down button 1306c with that hand's thumb, protrusions 1306a and 1306b may be recessed into barrel 1306h and pin 1306 may be inserted into or withdrawn from holes in tube 1307. Releasing button 1306c may allow protrusions 1306a & b to reemerge and lock pin 1306 in place. Insertion of pin 1306 may lock handle 605 in place at the selected 45 degree increment and removal of pin 1306 may allow handle 605 to rotate freely.

Lanyard 1306e, clip 1306f and hole 1306g may be used to bolt pin 1306 to primary handle 606 for operator convenience.

Figure 14:
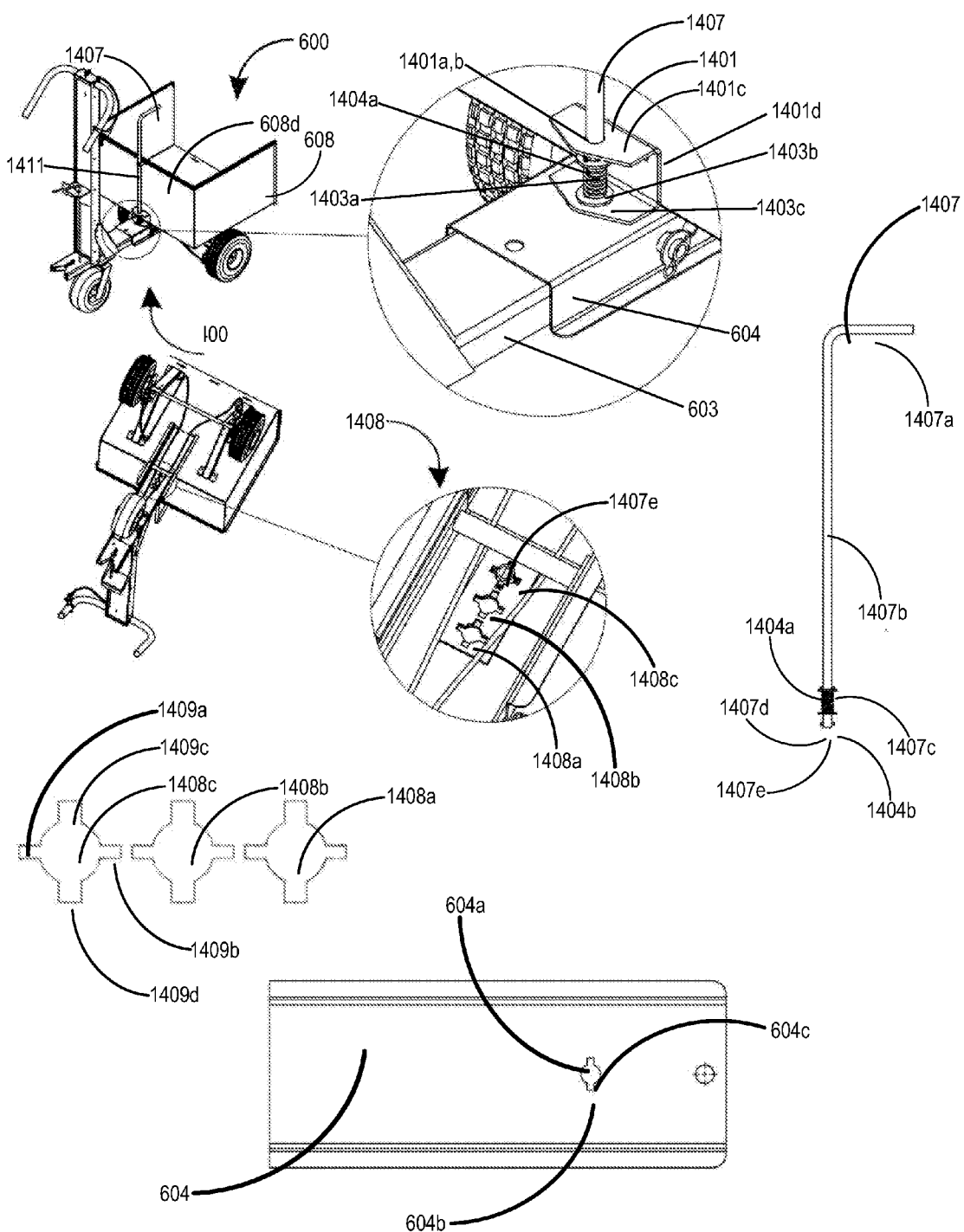
FIG. 14 illustrates the locking system between the lever arm and the load arm of a transport system.

FIG. 14 illustrates mechanism 1400 that may lock main rail 604 to lever arm 603 when 600 is being used to transport material. Mechanism 1400 also may unlock main rail 604 from lever arm 603 so that transport 600 may dump its contents, as illustrated in FIGS. 4A-D.

The components of mechanism 1400 may consist of u-bracket 1401 with holes 1401a, b (b not shown; underneath washer 1403c), key 1407 (consisting of handle 1407a, shaft 1407b, holes 1407c,d and end 1407e), washers 1403a, c, compression spring 1403b, and Dowell or rolled pins 1404a,b. The mechanism 1400 may be assembled by inserting end 1407e of key 1407 through hole 1401a, washer 1403a, compression spring 1403b, washer 1403c, and hole 1401b. At this point, Dowell or rolled pin 1404b may be inserted into hole 1407d in order to lock key 1407 in bracket 1401. After that Dowell or roll pin 1404a may be inserted between the bottom of plate 1401c of u-bracket 1401 and washer 1403a, then into hole 1407c and centered therein.

By turning key 1407 to align Dowel or roll pin 1404b with slots 604a,b, end 1407e may be inserted into hole 604c of main frame 604. Then back 1401d of u-bracket 1401 may be positioned and welded (or fastened by other means such as bolting or riveting) to tub front 608d as shown in detail 1400 of FIG. 14. Shaft 1407b of key 1407 may be loosely secured to the top of tub front 608d with clamp 1411. Clamp 1411 may stabilize key 1407 without interfering with either the turning or the sliding up and down of key 1407.

The wide tabs 1409c,d of holes 1408a-c may be sized so that Dowell or rolled pin 1404b may pass through them, and tabs 1409a,b may be sized so that Dowell or rolled pin 1404b may not pass through. By proper positioning and turning key 1407 to align Dowell or rolled pin 1404b to tabs 1409c,d, key end 1407e may be inserted into hole 1408c of lever arm 603. By pushing down on handle 1407a further and turning it 90 degrees, Dowell or rolled pin 1404b may be aligned beneath tabs 1409a, b. Re-leasing handle 1407a may allow Dowell or rolled pin 1404b to engage tabs 1409a,b of lever arm 603 and thus lock tub 608's main rail 604 to lever arm 603. Reversing these steps may unlock main rail 604 from lever arm 603 of transport system 600 so that tub 608's contents may be dumped.

Figure 15A:
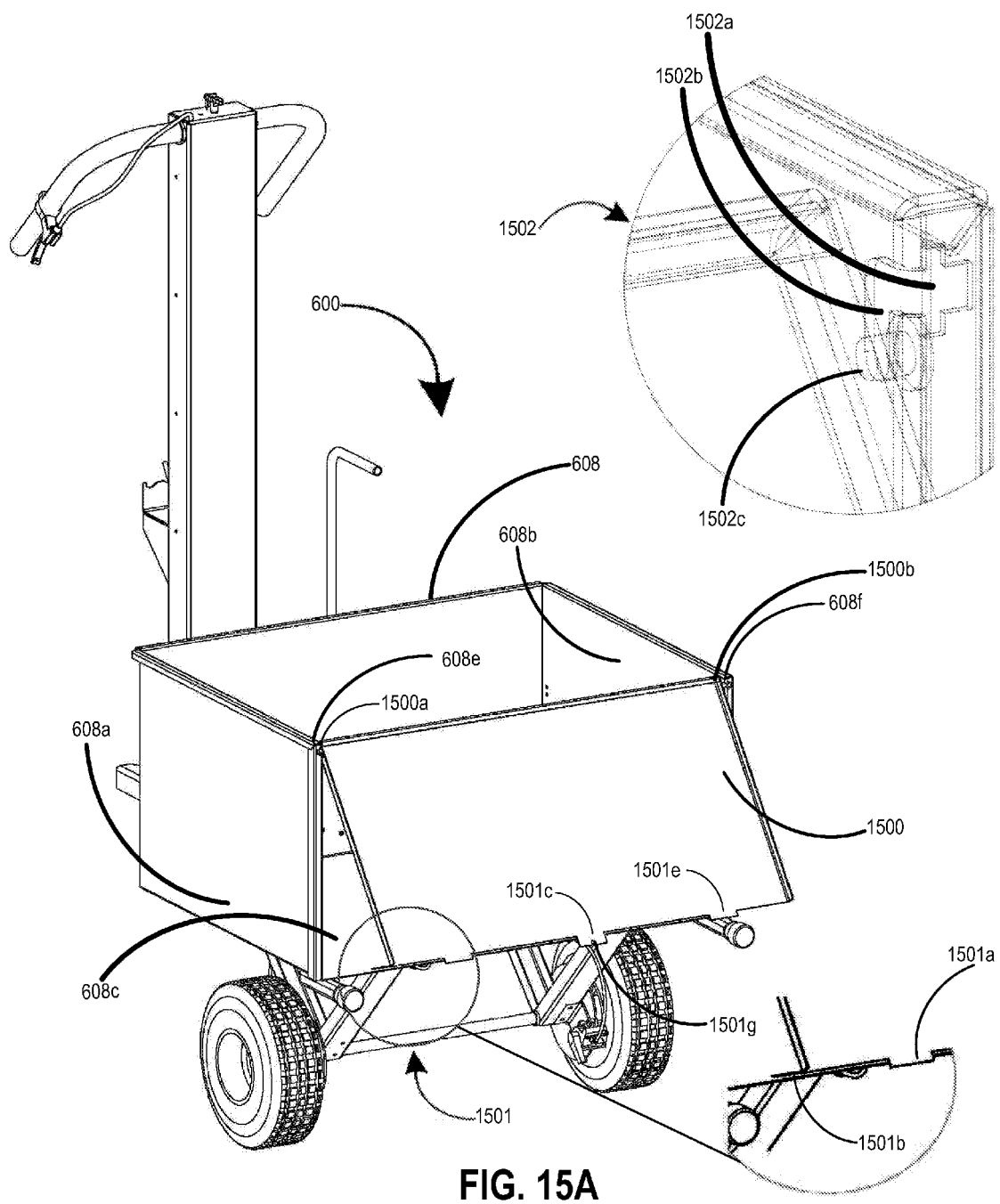
FIGS. 15A-B illustrate the features of an example tail gate for a transport system.
Figure 15B:
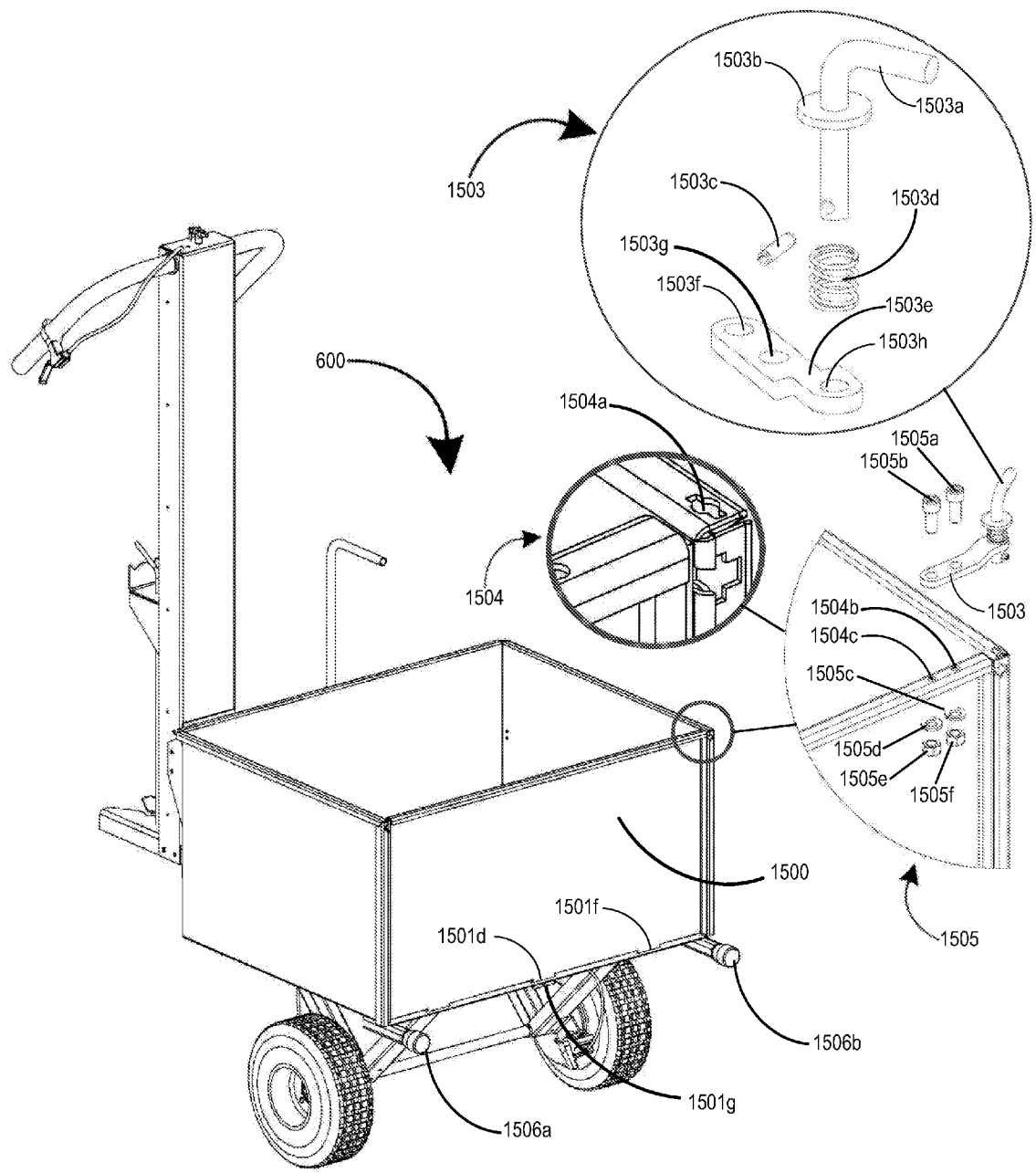

Another example implementation of a mechanism that may assist in dumping are the tubular extensions 1506a,b that are illustrated in FIG. 15B. The ends of extensions 1506a,b may contact the ground and provide a pivot point during the second stage of the dumping action. Extensions 1506a,b may act in an analogous, but opposite manner during the recovery of transport 600 from the dumped to the upright positions. Extensions 1506a,b may also protect tub 608 from damage during dumping, especially slots 1501b, d,f.

FIGS. 15A,B illustrate the design details and operating procedures for an implementation example of tail gate 1500 that may be utilized with tub 608 on transport systems such as 600. Tail gate 1500 may work properly if secure connections are provided between bottom 608c and tail gate 1500 and also at the interfaces of corners 1500a,b and side corners 608e,f.

Detailed illustration 1501 of FIG. 15A shows an example implementation for securing gate 1500 at bottom 608c of tub 608. Slots 1501b,d,f may be cut along the back edge of bottom 608c of tub 608 as shown on FIG. 15A. Corresponding tabs 1501a,c&e may be routed at the bottom of gate 1500 as shown in FIG. 15B. The dimensions and locations of tabs 1501a,c&e may be controlled so that tabs 1501a,c&e may be inserted, respectively, into slots 1501b,d,f when gate 1500 is installed.

Tabs 1501a,c,e inserted into slots 1501b,d,f may prevent the load from pushing gate 1500 out the back of transport 600 when it is being towed uphill. However, gate 1500 tabs may bend between the tab/slot connection when transporting heavy loads. In alternate implementation examples, gate 1500 may be strengthened by increasing the metal thickness or changing the metal alloy. Another alternative implementation may be to form the tabs by bending the metal at the bottom of tail gate 1500 outwards 90 degrees and then bending the tabs 90 degrees downwards. Another alternative implementation example may be to fold the edge of bottom 608c of tub 608 (in an analogous fashion as shown for the sides 608a,b in FIGS. 15A,B) into a "U" with corresponding slots in the top and bottom of the "U." Thus two slots (one above the other) are aligned into which tabs 1501a,c,e may be inserted. This configuration may prevent the tab from bending under pressure from the load, as may happen with the tabs in single slots.

The vertical, tab/slot connection may not prevent the gate from jumping up and out as may happen when a trailer bounces as it is pulled over rough ground. One implementation example that may prevent this from happening is to insert a pin into hole 1501g after tab 1501c has been inserted into slot 1501d (see FIG. 15B). So the combination of tab/hole/slot/pin may serve the two purposes of holding the gate down and further strengthening gate 1500's connection to bottom 608c. The pin in hole 1501h may prevent tab 1501c from being pulled up as it may be during the tab bending process from load pressure. In an analogous fashion, the gate to tub connection may be strengthen even further by adding the tab/hole/slot/pin configuration to tabs 1501a,e as well.

The tab/hole/slot/clip pin configuration may only secure gate 1500 to bottom 608c of the tub. As is illustrated by detail 1502 on FIG. 15A, the round headed tab 1502c may be inserted into notch 1502a and allowed to slide down grove 1502b as the tabs 1501a,c,e slide into slots 1501b,d,f, respectively. This mechanism may secure the top edge 1500b of gate 1500 to corner 608f of side panel 608b. A mirror image of the mechanism in detail 1502 may be placed at the top corner 1500a of the gate 1500 and corner 608e of side panel 608a to secure side 608a to gate 1500. To further strengthen the connection of the tail-gate 1500 to sides 608a,b, additional tab/slot combinations may be used on each side of the tub. For example, a second example implementation to the one illustrated on FIG. 15A may be to employ four tab/slot combinations with one in the middle and one at the top of each side.

Another example implementation of a mechanism that may simultaneously hold down gate 1500 and secure it to sides 608a,b is illustrated in FIG. 15B. Compression pin assembly 1503, assembled as illustrated from components 1503a-e, may be mounted on tail-gate 1500 as shown in detail 1505 using fasteners 1505a-f in mating holes 1503f,g to 1504b,c. After tail-gate 1500 has been connected at bottom 608c, each tub side 608a,b may be pulled in turn over against tail-gate 1500. In that position side panel 608b may be connected to tail-gate 1500 by pushing down on handle 1503a with Dowell or rolled pin 1503c aligned to the slots of hole 1504a so that the pin goes through hole 1504a, as is illustrated in details 1504 and 1505. By turning handle 1503a 90 degrees before releasing, compression spring 1503d. may lock the shaft 1503a within hole 1504a. This process may be repeated for side 608a. The use of compression pins 1503 may make the tab/slots 1502a-c of detail 1502 unnecessary as compression pin 1503 simultaneously holds tail gate 1500 down and tub side 608b in contact with tail-gate 1500.

Removal of gate 1500 may provide smooth side panels 608a,b and bottom 608c so that loads may readily slide or fall out when transport 600 is dumped, as is illustrated in FIGS. 4A to 4D.

Figures 16A, 16B, 16C:
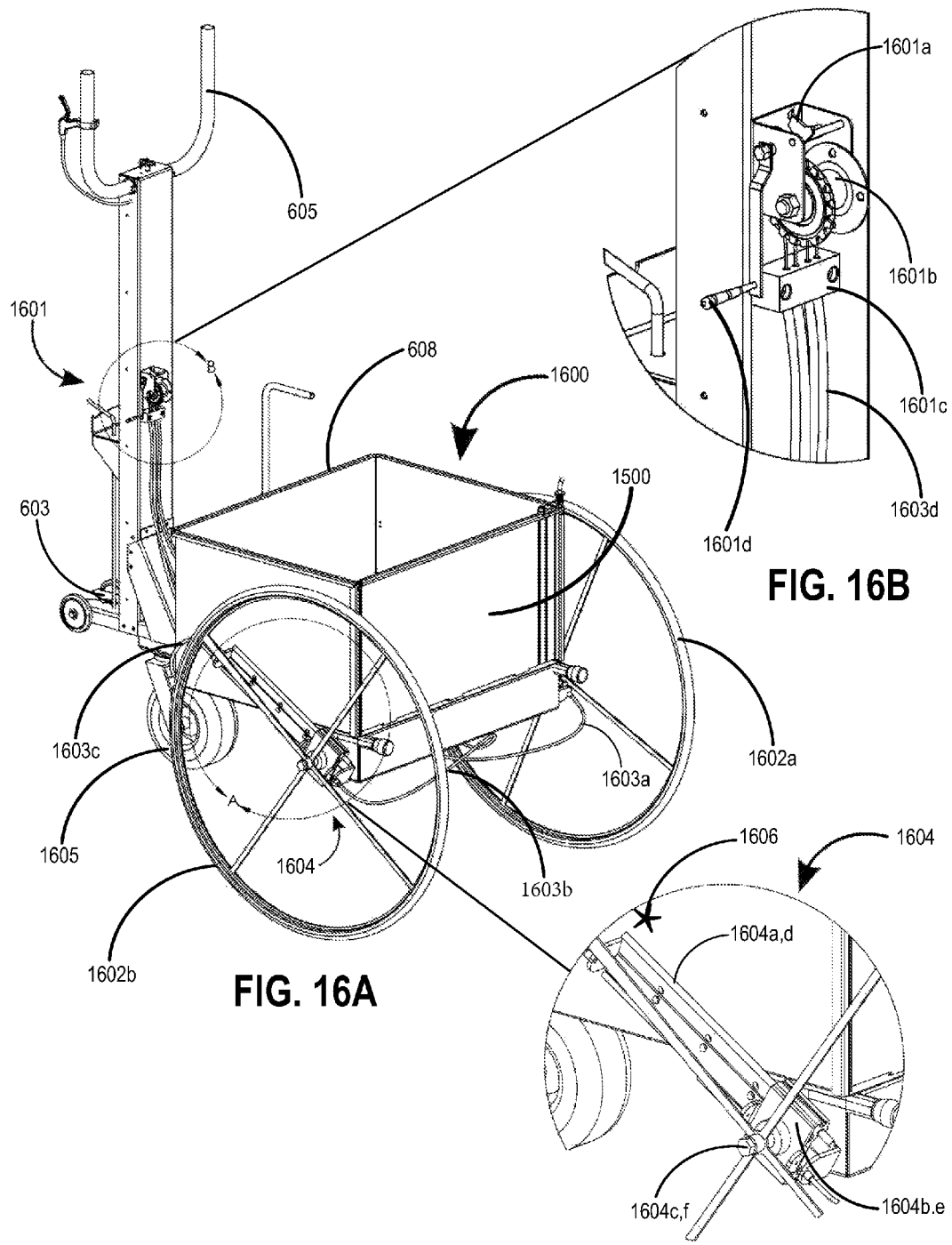
FIGS. 16A-C illustrate the heavy load dumping and obstacle climbing transport system.

FIGS. 16A-C illustrate another example implementation of a transport system. Transport system 1600 may be manually pushed over obstacles, pushed up a step or two (or loaded into a van) and may be used to dump heavy loads.

To aid in the discussion, the end of transport systems with handle 605 is designated as the front and the end with the tailgate is designated the back.

Block 1604b has internal bearings and may easily slide up and down the dual rail slide 1604a. As shown in detail 1604, moving block 1604b up may move hub 1604c with it which in turn moves wheel 1602b forwards. Alternatively, by turning handle 1601d in a specified direction, for example clockwise, drum 1601b of winch assembly 1601 may turn counterclockwise and take up the wire in cable 1603b. Block 1604b may be pulled down toward the end of slide 1604a by this action. The wire in cable 1603c may be counter-wound on hoist drum 1601b to the wire in cable 1603b. The wire in cable 1603c may be played out as cable 1603b's wire is taken up by hoist 1601. Turning handle 1601d in the opposite direction (counter-clockwise) may cause cable 1603b's wire to be played out as cable 1603c's wire is taken up by winch drum 1601b. Wires in cables 1603a-d may be separated from one another by partitions on drum 1601b and block 1601c. When turning handle 1601d, two-way brake 1601a may keep the load from pushing block 1604b back down. A mirror image of detail 1604 may be place on the opposite side of tub 608 for wheel 1602a and may be controlled simultaneously and in an analogous fashion by cables 1603a,d.

Continuing turning handle 1601d clockwise so that block 1604b moves further down toward the end of slide 1604a will raise the tail-gate end of transport 1600 and thus transfer more weight to caster 1605 from wheels 1602a,b. Turning handle 1601d in the opposite direction should then do the opposite. Continuing turning handle 1601d counter-clockwise until block 1604b is near the front end of slide 1640a, may move wheels 1602a,b forward toward the load's center-of-gravity-point 1606 and transfer weight to wheels 1602a,b from caster 1605. As the wheels 1602a,b move backwards toward the center-of-gravity-point 1606, the tendency of tub 608 to tip backward and downward may increase due to the load being more counter-levered toward the back. Moving wheels 1602a,b back 40% of the length of the tub reduces the weight that must be dumped by the mechanism illustrated in FIGS. 4A-D to 20% of the load (i.e., 40% of the load counterbalances an equal 40% of the load's weight). Given that the mechanical advantage of the mechanism in FIGS. 4A-D may be 8, then the operator may need to only provide a downward force of 2.5% of the load weight onto handle 605.

For example, a load of 1200 pounds may only require the operator to pull down on handle 605 with a force of 30 pounds. But movement of the wheels 1602a,b forwards away from gate 1500 may increase the tendency of transport 1600 to turn over. On the other hand, movement of the wheels 1602a,b backwards toward the tail gate 1500 may increase transport system 1600's stability. Therefore, mechanism 1604 may provide the means to stabilize transport 1600 during travel, but also may provide the means for easily dumping the load.

Sliding block 1604b down slide 1604a may lift the load in tub 608 against gravity and require work. If block 1604b was moved down when tub 608 was empty, then less work may be required. On the other hand, movement of block 1604b up slide 1604a is assisted by the load's weight in tub 608 and may be much easier to perform. Mechanisms 1601 and 1604 may provide procedures to increase the stability of transport 1600 before loading and to decrease the force on handle 605 that is required to dump the load.

The large diameter tires 1602a,b may require less force for transport system 1600 to be pushed over a curb or up a step than transport system 600 with smaller tires 1201b,d. The force required may be reduced as the wheels 1602a,b are moved backwards toward the tail-gate 1500 end of transport 1600. This action may cause the weight of the load to be transferred from wheels 1602a,b to swivel caster 1605. The weight on tires 1602a,b may be even less when the caster 1605 is swiveled backwards as shown in FIG. 16A. By locking swivel caster 1605 in this position, the weight on wheels 1602a,b may be reduced and the force required to push transport 1600 up a step to the next level may be even less.

After wheels 1602a,b are on the next level, unlocking swivel 1605 and pushing transport 1600 even farther toward the step may reverse the wheel direction of caster 1605 and transfer weight from caster 1605 to wheels 1602a,b that are now on the next level. Turning handle 1601d counter-clockwise so that block 1604b moves up slide 1604a (while holding transport 1600 stationary and brake system 1200 (not shown) is positioned "ON"), may transfer even more weight from caster 1605 to wheels 1602a,b. Since only 20% of the load's weight is now being lifted, it may be easier to push/lift caster 1605 up and over the step. Thus, large wheels 1602a,b, mechanisms 1601 and 1604, and a lockable swivel caster 1605 may permit the operator to raise (winch) heavy loads up a step or two to the next level.

The factors that may increase the mechanical advantage of winch 1601 are its gear ratio and the length of the arm of handle 1601d. Increasing the angle above the horizontal that slide 1604a is mounted may increase the force required to move block 1604b down slide 1604a. Reducing the angle of slide 1604a above the horizontal and increasing the length of slide 1604a may increase the amount of weight that can be transferred back and forth between wheels 1602a,b and castor 1605. Increasing the length to width ratio of tub 606 may accommodate slides 1604a,d with additional length and permit pushing transport 1600 up step(s) to an even higher elevation. Thus, mechanisms 1601 and 1604 along with the ways that they may be modified or mounted permit alternate example implementations to be produced to address specific requirements for load and volume capacities. In some alternate example implementations, winch 1601 may be replaced by levers or other simple machines that may provide sufficient mechanical advantage to dump intermediate loads of, for example, 900 pounds.

In some alternate implementation examples, only one slide 1604a may be employed with it placed between swivel caster 1605 and lever arm 603. Then, wheels 1602a,b may be permanently mounted with a counter-leverage of, for example, 30% of the load. In this implementation, only two wire-in-sheath cables would be required for wench assembly 1601 to move swivel caster 1605 either towards or away from the center-of-gravity-point 1606 of the load. Now the mechanical advantage of a first order lever system is lever arm length divided by load arm length. Therefore moving caster 1605 towards the load's center-of-gravity-point increases the mechanical advantage of the dumping mechanism and moving caster 1605 away decreases the mechanical advantage. Thus, a more rugged and cost effective method of shifting the center-of-gravity-point of the load to reduce the force required for dumping it may be produced by employing only one slide 1604a on the caster 1605. A transport system with this configuration may have a total mechanical advantage sufficient to dump 900 pounds of load or more.

Figures 17A, 17B:
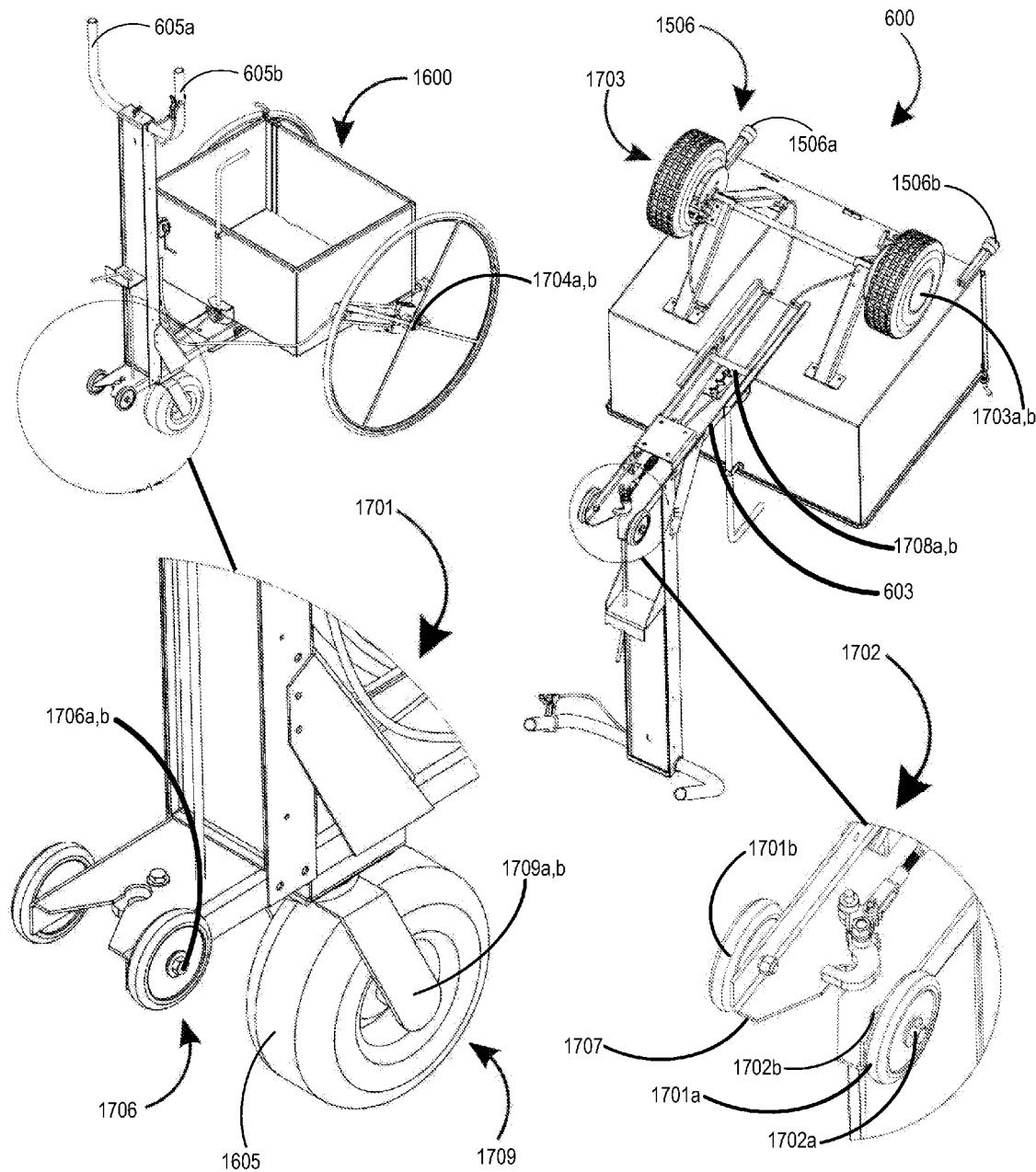
FIGS. 17A-B illustrate dumping assistance wheels.

FIGS. 17A,B illustrate another implementation example of a feature that may be employed on some transport systems to facilitate the dumping action previously illustrated in FIGS. 4A-D. Wheels 1701a,b hit the ground during the final stage of dumping and may facilitate the fulcrum pivoting required at that point More important, wheels 1701a,b may roll toward the operator during the recovery action when handle 605 is pulled backwards and up. This rolling action may greatly facilitate the recovery action and avoid having to drag end 1707 of lever arm 603 of transport 1600 along the ground. Detail 1702 illustrates how wheel 1701a may be mounted with shoulder bolt 1702a and hex nut 1702b on lever arm 603. Wheel 1701b may be mounted on lever arm 603 in a similar fashion.

The dumping sequences of example implementation transport systems such as 600 and 1600 may involve four lever systems acting quasi sequentially/quasi simultaneously. Mathematical analysis of this situation is made more difficult when tailgate 1500 is removed and material is continually being removed from tub 608 as the dumping action progresses. Both the location and the weight of the center-of-gravity-point is constantly changing. Since the mechanical advantages of all four lever systems are rapidly increasing and reach infinity at the end of the dump, rigorous mathematical analysis is complicated even further. For this disclosure, a qualitative analysis may convey what is happening in the dumping process of transport system 600.

Again, for this disclosure, three parts of a lever are defined: (1) the lever or force arm is the section and length (FA) of the lever between the lifting force and the fulcrum, (2) the fulcrum is the fixed hinged pivot line of the lever and (3) the load arm is the section and length(LA) of the lever between the fulcrum and the load. The lever fulcrum pivot lines are shown on FIGS. 17A,B and the end points of load and lever arms are illustrated on FIGS. 12 to 17 inclusive. As will be presented below, lever systems are designated by the base number of the fulcrum (i.e., 1703 for lever system associated with hinge-pivot-line 1703a,b). The mechanical advantage (MA) of a first or second class lever system may be approximated from FA divided by (LA times Sine $\theta$) where $\theta$ is the absolute value of the angle between the vertical and FA (http://www.exrx.net/ Kinesiology/Levers.html). When FA is vertical, $\theta$ equals 0 degrees and MA is infinite, since Sine 0 degrees equals zero. The example of the wheelbarrow as a second class lever may show that this is intuitively true. As the hands lift the handles, weight is transferred from the hands to the wheel. When the handles reach the vertical, all the weight not dumped is on the wheels and no weight or force is on the hands. In other words, the weight or force on the hands is zero. Now MA also equals force output divided by force input. Since force input is zero MA is infinite when the handles are vertical.

The first lever system that may be involved in the dumping of transport system 600 is second class lever system 1703 for which force arm FA1703 is the distance from hinge line 1708a,b to the fulcrum pivot line 1703a,b. Load arm LA1703 of lever system 1703 is the distance from the center-of-gravity-point 1606 of the load to the fulcrum pivot line 1703a,b. If a lifting force is applied at hinge line 1708a.b, then FA1703 may lift the front of the tub and rotate it about the axle of back wheels 1703a,b. acting as the fulcrum hinged pivot line. This rotation may cause wheels 1201b,d to roll forward toward the operator, thus contributing to θ going towards zero and more rapidly increasing MA of 1703. Rotation of lever system 1703 continues until pivot line 1506a,b of lever system 1506 hits the ground and wheels 1201b,d are in the air. For second class lever system 1506, the force arm FA1506 is the distance from hinge point 1708a,b to the fulcrum pivot line 1506a,b. Load arm LA1506 of 1506 lever system is the distance from the center-of-gravity-point 1606 of the load to the fulcrum pivot line 1506a,b.

Now MA of a lever system permits a heavier object to be lifted by a smaller force due to the force arm being longer than the load arm. But, the downside of a lever is that the vertical distance an object is lifted is inversely proportional to MA. When lever system 1703 is horizontal (θ is 90 degrees) before the lift begins, MA1703 or FA1703/LA1703 is at its minimum. Reducing LA1703 relative to FA1703 increases MA1703 and reduces the force required to initiate the lift. Once pivot line 1506a,b hits the ground, θ is large and the initial MA1506 may be small to allow greater vertical movement from lever system 1506 at that time.

First class lever system 1709 provides the lifting force at the hinged 1708a,b line for lever systems 1703 and 1506. The force arm FA1709 is the lever section from handles 605a,b to fulcrum pivot line 1709a,b. The load arm LA1709 is the lever section from fulcrum pivot line 1709a,d to hinged line 1708a.b. By making FA1709 longer relative to LA1709, MA1709 may be made larger to provide more force at hinge 1708a,b. In addition, rotating handle 605 so that it is 45 degrees from straight up and installing bar 605a-b may be the optimum trade-off for compromising ergonomic requirements with maximized MA1709. Since the output of lever system 1709 provides the input to lever systems 1703 and 1506 sequentially, the MA of the two lever systems (either 1709 and 1703 or later on 1709 and 1506) at any time in the lift is the sum of the MA's of the two lever systems involved at that time. This is true until pivot line 1506a,b leaves the ground. Lifting from lever system 1709 continues until wheels 1701a,b contact the ground and caster wheel 1605 looses contact. First class leaver system 1706 may take over the lift with the force arm FA1706 being from handles 1605a,b to fulcrum point line 1706a.b and with load arm LA1706 being from fulcrum point line 1706a,b to hinged point 1708a,b. Again as was the case for second class levers 1703 and 1506, first class lever systems 1709 and 1706 may be designed so that MA1709 is large with less vertical movement of the load and MA1706 may be smaller initially with greater vertical movement of the load.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

What is claimed is:

1. A transport system comprising:
   a tub;
   a single longitudinal frame support to support the tub from an underside surface of the tub;
   a single lever arm extensible outwardly from the single longitudinal frame support; and
   a single upright handle coupled to the single lever arm and extended upwardly from the single lever arm;
   wherein the single longitudinal frame support, single lever arm, and single upright handle collectively form a single lift-arm, at least one fulcrum, and a single rail transport system.

2. The transport system of claim 1, further comprising:
   a hitching assembly, coupled to the single lever arm and with which to couple the transport device to a towing vehicle, the hitching assembly comprising:
   a hook;
   a gear mechanism;
   a shaft coupled to the gear mechanism and configured to turn the gear mechanism; and
   a shaft handle with which to rotate the shaft;
   wherein the hook is rotatable by operation of the shaft handle between an OPEN position to unhitch and a CLOSED position to tow.

3. The transport system of claim 2, wherein the single lever arm further comprises a V-shaped groove at a distal end, the V-shaped grove configured for receipt of a hitching pin to couple with the hitching assembly hook when engaged.

4. The transport system of claim 2, further comprising:
   a hitch configured to mount to a towing vehicle, the hitch configured to couple to the hitching assembly.

5. The transport system of claim 4, wherein the hitch further comprises:
   a main frame;
   a hitch pin disposed vertically within the main frame and operable to move up and down vertically and configured to be locked in an UP or DOWN position; and
   a control pin to control the vertical position of the hitch pin.

6. The transport system of claim 5, further comprising:
   a compression spring, with the hitch pin and control pin, configured to lock the hitch in an UP or DOWN position.

7. The transport system of claim 5, further comprising:
   a knob disposed upon the hitch pin and configured to be operably grasped to manipulate the hitch pin.

8. The transport system of claim 2, further comprising:
   a braking system comprising:
   at least one brake drum;
   at least one brake caliper;
   at least one control cable; and
   a tension spring coupled to the hitching assembly;

wherein the at least one cable and tension spring are mechanically coupled and operation of a lever controls the at least one brake caliper.

9. The transport system of claim 1, further comprising:
an adjustable handle assembly comprising:
an adjustable two-arm handle;
wherein the handle is a U or D-style, secondary handle supported on the single upright handle and is adjustable 360 degrees in 45-degree increments.

10. The transport system of claim 9, further comprising:
a lock pin configured to lock the adjustable two-arm handle in place once adjusted to the, single upright handle.

11. The transport system of claim 1, further comprising:
a tub-to-handle assembly locking key system configured to lock the single longitudinal frame support to the single lever arm when the transport system is used to transport material and also to unlock the single longitudinal frame support from the single lever arm so that the transport system may dump its contents.

12. The transport system of claim 11, the key system further comprising:
a u-bracket;
a handle having a distal end configured for placement through the u-bracket;
a compression spring disposed around the distal end of the handle at a portion within the u-bracket;
at least one rolled pin; and
wherein a turn of the at least one rolled pin to align the at least one rolled pin allows insertion into a hole in the single lever arm and another turn locks the tub and a reverse turn unlocks the tub.

13. The transport system of claim 1, further comprising:
a tailgate disposed on the tub and configured to swing open to unload contents from within the tub; and
at least one closure device to secure the tailgate in place to the tub.

14. The transport system of claim 13, wherein the at least one closure device is configured to fasten the tailgate to a bed of the tub.

15. The transport system of claim 13, wherein the at least one closure device is configured to fasten the tailgate to two sides of the tub.

16. The transport system of claim 13, wherein the at least one closure device is a compression spring device configured to hold down the tailgate relative to the tub and to prevent the tailgate from opening unexpectedly.

17. The transport system of claim 1, further comprising:
a swivel caster wheel disposed generally under the single upright handle;
a pair of wheels, with a first of said wheels disposed on an exterior side of the transport system and a second of said wheels disposed on an opposing side, each wheel having a hub at its center; and
a pair of rail slides, with a first of said rail slides disposed on an exterior side of the transport system and a second of said rail slides disposed an opposing side;
wherein the first wheel is mounted to the first rail slide and is configured at its hub to slide about the first rail slide;
wherein the second wheel is mounted to the second rail side and is configured at its hub to slide about the second rail slide; and
wherein as the first and second wheels slide about the first and second rail slides, a center-of-gravity point relative to the wheels is relocated;
thereby as the first wheel and second wheel are counter-levered toward a rear of the transport system, it serves to move a center of gravity, take weight off of the swivel caster wheel, and to increase a leverage and a mechanical advantage of the transport system.

18. The transport system of claim 17, wherein the transport system is configured for operator use as needed to shift weight, and the center of gravity, balanced between the swivel caster wheel and the first wheel and second wheel thereby to transition between use needs with increased leverage and mechanical advantage or transport system stability.

19. The transport system of claim 1, further comprising:
a pair of dumping wheels disposed on the single lever arm and configured to facilitate a dumping action as the wheels make contact with the ground and facilitate pivoting of the single lever arm.

20. The transport system of claim 1, further comprising:
dual fulcrum pivot lines for both first class and second class lever systems.

* * * * *